(12) United States Patent
Takeda

(10) Patent No.: US 10,031,854 B2
(45) Date of Patent: Jul. 24, 2018

(54) MEMORY SYSTEM

(71) Applicant: KABUSHIKI KAISHA TOSHIBA, Tokyo (JP)

(72) Inventor: Susumu Takeda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 162 days.

(21) Appl. No.: 15/067,558

(22) Filed: Mar. 11, 2016

(65) Prior Publication Data

US 2016/0275017 A1    Sep. 22, 2016

(30) Foreign Application Priority Data

Mar. 20, 2015    (JP) ................. 2015-058740

(51) Int. Cl.
  *G06F 12/00*    (2006.01)
  *G06F 12/0893*  (2016.01)
  *G06F 12/1027*  (2016.01)
  *G06F 1/32*     (2006.01)

(52) U.S. Cl.
  CPC ........ *G06F 12/0893* (2013.01); *G06F 1/3275* (2013.01); *G06F 12/1027* (2013.01); *G06F 2212/608* (2013.01); *G06F 2212/68* (2013.01); *Y02D 10/13* (2018.01); *Y02D 10/14* (2018.01)

(58) Field of Classification Search
  None
  See application file for complete search history.

(56) References Cited

U.S. PATENT DOCUMENTS

| 6,195,754 | B1 | 2/2001 | Jardine et al. |
| 8,296,518 | B2 | 10/2012 | Maruyama |
| 8,495,300 | B2 | 7/2013 | Ng et al. |
| 8,775,752 | B2 | 7/2014 | Yoshida et al. |
| 8,949,572 | B2 | 2/2015 | Kurosawa et al. |
| 2008/0235486 | A1* | 9/2008 | Sepulveda .......... G06F 11/1441 711/206 |
| 2010/0100685 | A1* | 4/2010 | Kurosawa .......... G06F 12/1054 711/128 |

(Continued)

FOREIGN PATENT DOCUMENTS

| JP | 2002-182803 | 6/2002 |
| JP | 2010-97558 | 4/2010 |
| JP | 4608011 | 1/2011 |

(Continued)

OTHER PUBLICATIONS

Office Action dated Mar. 8, 2016, in counterpart Japanese Patent Application No. 2015-058740; 6 pages.

(Continued)

*Primary Examiner* — Daniel D Tsui
(74) *Attorney, Agent, or Firm* — Finnegan, Henderson, Farabow, Garrett & Dunner, L.L.P.

(57) ABSTRACT

A memory system has a non-volatile memory used as a first cache memory to be accessed at a higher speed than a main memory, a first translation lookaside buffer that stores address conversion information indicating the conversion of a virtual address issued by a processor into a physical address, and a first control circuitry that stores the address conversion information stored in the first translation lookaside buffer in the non-volatile memory during a power off.

17 Claims, 23 Drawing Sheets

(56) References Cited

U.S. PATENT DOCUMENTS

2010/0159688 A1* 6/2010 Rinerson ............ G11C 11/5685
438/598

FOREIGN PATENT DOCUMENTS

| | | |
|---|---|---|
| JP | 5404798 | 2/2014 |
| JP | 5570621 | 8/2014 |
| WO | WO-2015/020092 | 2/2015 |

OTHER PUBLICATIONS

Bhattacharjee, A. (Dec. 7-11, 2013). "Large-Reach Memory Management Unit Caches," *MICRO-46*; pp. 383-394.

* cited by examiner

11:PAGE ENTRY INFORMATION

MEMORY SYSTEM

CROSS REFERENCE TO RELATED APPLICATIONS

This application is based upon and claims the benefit of priority from the prior Japanese Patent Application No. 2015-58740, filed on Mar. 20, 2015, the entire contents of which are incorporated herein by reference.

FIELD

The present invention relates to a memory system including a non-volatile memory.

BACKGROUND

When access to a memory is performed, in general, a virtual address issued by a processor is converted into a physical address and the converted physical address is used to access a cache memory or a main memory.

A process which converts a virtual address into a physical address is performed by a translation lookaside buffer (TLB). The access speed of the TLB has a great effect on the processing performance of a processor.

In general, the TLB is a high-speed SRAM. The SRAM is a volatile memory and data stored in the SRAM is erased when power is turned off. Therefore, in a case in which the TLB is formed by an SRAM, when power is turned on, a process of copying some of address conversion information from a page table to the TLB needs to be performed and it takes a lot of time until the TLB can be accessed, in addition, the memory size of the TLB is limited. Therefore, when a miss occurs in the TLB, it is necessary to acquire necessary address conversion information from the page table and it takes a lot of time to perform an address conversion process.

The processor accesses a cache memory before accessing a main memory. Therefore, there is a large difference between an access speed when data requested by the processor is stored in the cache memory and an access speed when the data is not stored in the cache memory. For this reason, in recent years, two or more levels of cache memories or a high-capacity cache memory has been provided to improve a cache hit rate.

However, in some cases, even when a high-capacity cache memory is provided, only a fraction of the cache memory is used and it is difficult to effectively use the high-capacity cache memory.

DETAILED DESCRIPTION

According to one embodiment, a memory system has a non-volatile memory used as a first cache memory to be accessed at a higher speed than a main memory, a first translation lookaside buffer that stores address conversion information indicating the conversion of a virtual address issued by a processor into a physical address, and a first control circuitry that stores the address conversion information stored in the first translation lookaside buffer in the non-volatile memory during a power off.

First Embodiment

Figure 1:
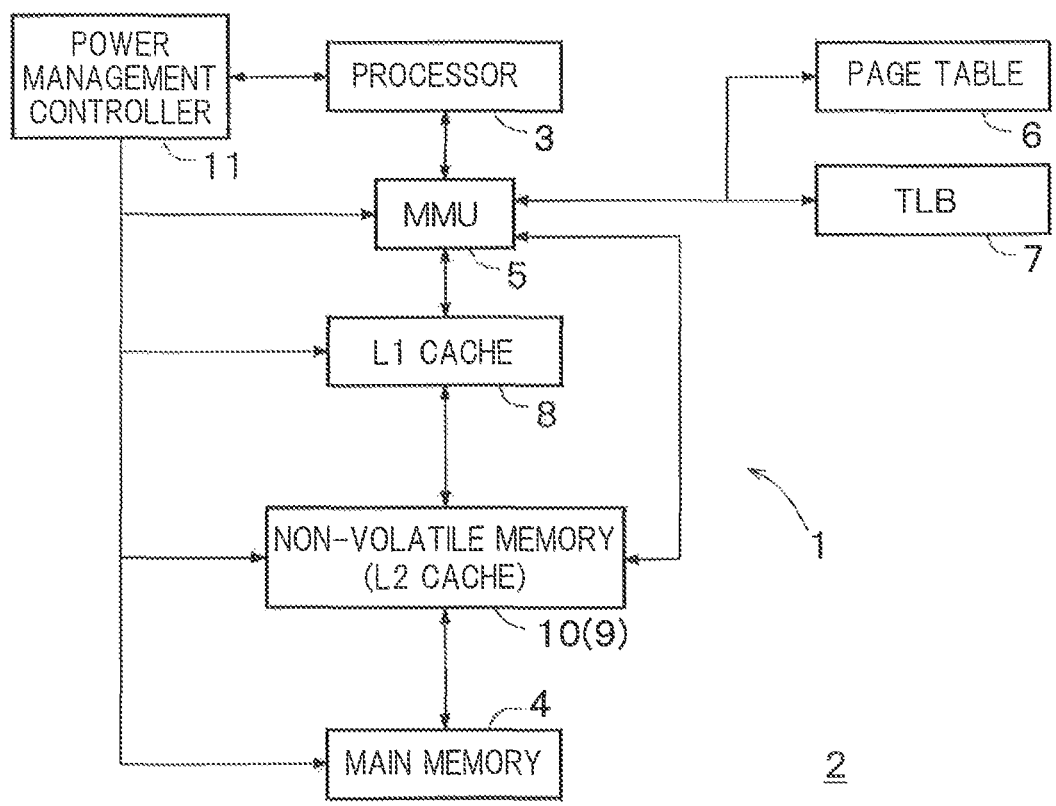
FIG. 1 is a block diagram schematically illustrating the structure of a processor system 2 including a memory system 1 according to a first embodiment.

FIG. 1 is a block diagram schematically illustrating the structure of a processor system 2 including a memory system 1 according to a first embodiment. The processor system 2 illustrated in FIG. 1 includes a memory system 1, a processor 3, and a main memory 4.

The memory system 1 includes a memory management unit (MMU) 5, a page table 6, a translation lookaside buffer (TLB) (first translation lookaside buffer) 7, a primary cache memory (an L1 cache; a second cache memory) 8, a non-volatile memory 10 which can be used as a secondary cache memory (an L2 cache; a first cache memory) 9, and a power management controller (first control circuitry) 11.

The L1 cache 8 and the non-volatile memory 10 which can be used as the L2 cache 9 store at least a portion of data stored in the main memory 4 or at least a portion of data to be stored in the main memory 4. Hereinafter, in some cases, the non-volatile memory 10 is referred to as the L2 cache 9.

Each of the L1 cache 8 and the L2 cache 9 has a tag portion storing address information that can uniquely identify data stored in the cache. The tag portion is mounted in various ways. For example, the tag portion is stored in a dedicated memory region or is stored in a portion of the memory region which stores data. In this embodiment, the mounting methods can be combined with each other.

FIG. 1 illustrates an example in which a two-level cache memory including the L2 cache 9 is provided. However, a cache memory that is at a higher level than the L2 cache 9 may be provided. That is, in this embodiment, two or more memories having different characteristics are provided at different levels. The precondition is that two or more memories having different characteristics are provided at the same level. Here, the characteristics are, for example, access speeds. In addition, the characteristics may be power consumption, a memory size, or various characteristics for distinguishing memories.

Hereinafter, for simplicity of explanation, an example in which the memory system has a two-level cache structure including the L2 cache 9 will be described.

The processor 3, the MMU 5, the L1 cache 8, and the non-volatile memory 10 except for the main memory 4 are integrated into, for example, one chip. Alternatively, the memory system 1 may have the following structure: the processor 3, the MMU 5, and the L1 cache 8 are integrated into one chip; the non-volatile memory 10 which is used as the L2 cache 9 is integrated into another chip; and these units are directly coupled to each other by metal wires on the basis of a laminated structure of the chips. Hereinafter, in some cases, the L1 cache 8 and the non-volatile memory 10 are generically referred to as a "cache" or a "cache memory".

The L1 cache 8 and the non-volatile memory 10 are semiconductor memories which have a higher access speed than the main memory 4. A data arrangement policy for the L1 cache 8 and the non-volatile memory 10 which can be used as the L2 cache 9 can vary in various ways. For example, there is an inclusion policy. In this case, all of the data stored in the L1 cache 8 is stored in the L2 cache 9.

In addition, for example, there is an exclusion policy. In this policy, for example, the same data is not arranged in the L1 cache 8 and the L2 cache 9. Furthermore, for example, there is a hybrid policy of the inclusion policy and the exclusion policy. In this policy, for example, some of data is redundantly stored in the L1 cache 8 and the L2 cache 9 and some of data is exclusively stored in the L1 cache 8 and the L2 cache 9.

These policies are data arrangement policies for the L1 cache 8 and the L2 cache 9 and various combinations of these policies are considered in a multi-level cache structure. For example, the inclusion policy may be used for all levels. For example, the L1 cache 8 may be based on the exclusive policy and the L2 cache 9 and the main memory 4 may be based on the inclusion policy. In addition, the above-mentioned various data arrangement policies may be arbitrarily combined with each other.

There are various methods for updating the cache. In this embodiment, these methods can be combined with each other. For example, when a cache write hit occurs, a write policy may be a write-through policy or a write-back policy. In addition, when a cache write miss occurs, the write policy may be a write-allocate policy or a no-write-allocate policy.

The write-allocate policy reads data from a lower-level cache or the main memory 4 and updates the cache when a cache miss occurs. The no-write-allocate policy does not update the cache even through a cache miss occurs.

The memory size of the non-volatile memory 10 which is used as the L2 cache 9 is equal to or greater than the memory size of the L1 cache 8. As such, a higher-order cache memory has a larger memory size. Therefore, it is preferable that a high-order cache memory be a memory which has a high degree of integration and has low leakage power that tends to be proportional to a memory size. For example, the non-volatile memory 10, such as a magnetoresistive random access memory (MRAM), is considered as the memory. In addition, for example, the memory may be an SRAM or a DRAM using a low leakage power process.

At least a portion of the non-volatile memory 10 according to this embodiment can be used as the L2 cache 9 or the TLB 7, which will be described below. In addition, when power is turned off, address conversion information stored in the TLB 7 which is provided separately from the non-volatile memory 10 can be saved (stored) to the non-volatile memory 10.

The power management controller 11 acquires, for example, operation information of the processor 3 and performs control such that the address conversion information in the TLB 7 is saved (stored) to the non-volatile memory 10 when the processor 3 is in a low load state or when power is turned off. The reason why the power management controller 11 saves (stores) the address conversion information in the TLB 7 to the non-volatile memory 10 is as follows. The TLB 7 is a volatile memory such as an SRAM. When power is turned off, the address conversion information in the TLB 7 is erased. After power is turned on again, a portion of page entry information needs to be copied from the page table 6 to the TLB 7. As a result, the processing performance or execution efficiency of the processor 3 is likely to deteriorate until the TLB 7 completes its preparations. As in this embodiment, in a case in which the address conversion information in the TLB 7 is saved (stored) to the non-volatile memory 10 when power is turned off, when power is turned on again, it is possible to write the address conversion information back from the non-volatile memory 10 to the TLB 7 at a high speed, to reduce the frequency of TLB miss after power is turned on, and to reduce the processing overhead of the processor 3.

The power management controller 11 turns off the MMU 5, for example, when the processor 3 is in a low load state. There are various power-off policies for the power management controller 11. In this embodiment, various power-off policies can be combined with each other.

The page table 6 is a table which stores the mapping between a virtual address space and a physical address space managed by an operating system (OS). In general, the virtual address is used as an index and the page table 6 has a region which stores, for example, the physical address corresponding to each virtual address.

A region corresponding to one virtual address in the page table 6 is referred to as a page entry. In general, the page table 6 is provided in a main memory space of the main memory 4. This embodiment can be applied to various types of page tables. For example, this embodiment can be applied to a page table in which a physical address is used as an index and which has a region that stores, for example, a virtual address corresponding to each physical address.

The TLB 7 is a memory region which caches some page entries in the page table 6. In general, the TLB 7 is mounted as a hardware component and has a higher access speed than the page table 6 which is implemented by software. The TLB 7 is, for example, an SRAM. The TLB 7 includes a TLB controller for accessing the TLB 7, which is not illustrated in FIG. 1.

The MMU 5 manages the TLB 7 and the page table 6 and provides, for example, an address conversion function (virtual storage management) which converts a virtual address issued by the processor 3 into a physical address, a memory protection function, a cache control function, and a bus arbitration function. A high-level cache, such as the L1 cache 8, is accessed by a virtual address. In general, a memory that is at a lower level than the L2 cache 9 is accessed by the physical address converted by the MMU 5. The MMU 5 updates a conversion table including the virtual addresses and the physical addresses when data is arranged and ejected to the main memory 4. The MMU 5 is mounted in various ways. For example, the entire MMU5 is mounted as a hardware component, is implemented by software, or is mounted by a hybrid structure thereof. In this embodiment, the mounting methods can be combined with each other.

In FIG. 1, the TLB 7 is provided separately from the MMU 5. However, in general, the TLB 7 is provided in the MMU 5. In this embodiment, for convenience, the MMU 5 and the TLB 7 are individually treated. However, the embodiment includes, for example, a case in which the TLB 7 is provided in the MMU 5. For example, the processor 3 may separately manage the MMU 5 and the TLB 7.

The main memory 4 has a larger memory size than the L1 cache 8 and the non-volatile memory 10. Therefore, in many cases, the main memory 4 is formed by one or more chips, separately from the chip in which the processor 3 is mounted. A memory cell forming the main memory 4 is, for example, a dynamic RAM (DRAM) cell. In addition, the main memory 4 and the processor 3 may be provided in one chip, using a through silicon via (TSV) technique.

Figure 2:
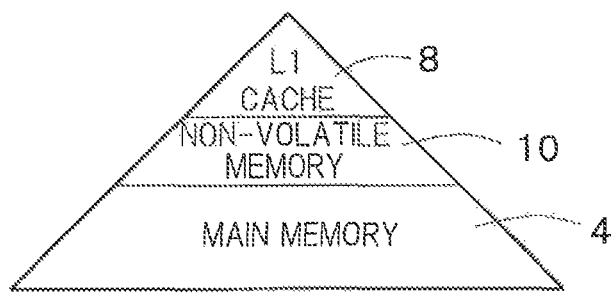
FIG. 2 is a diagram illustrating the access priority of an L1 cache 8, a non-volatile memory 10 which can be used as an L2 cache 9, and a main memory 4 in the first embodiment.

FIG. 2 is a diagram illustrating the access priority of the L1 cache 8, the non-volatile memory 10 which can be used as the L2 cache 9, and the main memory 4 in the first embodiment. As illustrated in FIG. 2, a physical address corresponding to the virtual address issued by the processor 3 is transmitted to the L1 cache 8 first. When data (hereinafter, referred to as target data) corresponding to the physical address is present in the L1 cache 8, the processor 3 accesses the data. The L1 cache 8 has a memory size of, for example, several tens of kilobytes.

When the target data is not present in the L1 cache 8, the corresponding physical address is transmitted to the non-volatile memory 10 which can be used as the L2 cache 9.

When the target data is present in the non-volatile memory 10, the processor 3 accesses the data. The non-volatile memory 10 has a memory size of, for example, about several hundreds of kilobytes to several megabytes.

When the target data is not present in the non-volatile memory 10 which can be used as the L2 cache 9, the corresponding physical address is transmitted to the main memory 4. In this embodiment, it is assumed that all of the data stored in the non-volatile memory 10 is stored in the main memory 4. This embodiment is not limited to the above-mentioned data arrangement policy between the caches.

Data which is managed in units of pages by the MMU 5 is stored in the main memory 4. In general, the data which is managed in units of pages by the MMU 5 is arranged in the main memory 4 and an auxiliary memory device. In this embodiment, it is assumed that all of data is arranged in the main memory 4 for convenience of explanation. In this embodiment, when the target data is present in the main memory 4, the processor 3 accesses the data. The main memory 4 has a memory size of, for example, about several gigabytes.

As such, the cache memory including the L1 cache 8 and the non-volatile memory 10 has a hierarchy structure and a higher-order (lower-level) cache memory has a larger memory size.

In this embodiment, it is assumed that all of the data stored in a low-order (high-level) cache memory is stored in a high-order cache memory for convenience of explanation.

Figure 3:
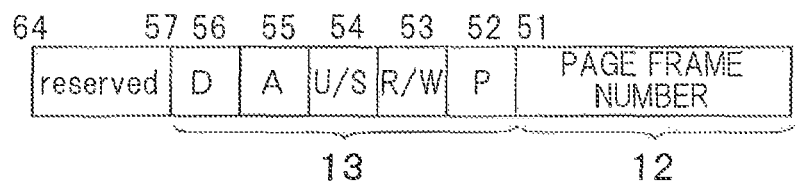
FIG. 3 is a diagram illustrating an example of page entry information 12.

The TLB 7 stores page entry information and page number in each page so as to be associated with each other. Virtual address information is stored in the page number. FIG. 3 is a diagram illustrating an example of the page entry information 12. The page entry information 12 illustrated in FIG. 3 includes a page frame number 13 and attribute information 14.

Physical address information corresponding to the page number (virtual address information) is stored in the page frame number 13.

The attribute information 14 includes, for example, dirty bit information D, access bit information A, user/supervisor bit information U/S, read/write bit information R/W, and present bit information P. The dirty bit information D is set to 1 when data is written to this page. The access bit information A is set to 1 when this page is accessed. The user/supervisor bit information U/S is used to set whether to use the page in a user mode or a supervisor mode. The read/write bit information R/W is set to 0 when only a read operation is performed and is set to 1 when a write operation is performed. The present bit P is set to 1 when this page is present in the main memory 4.

Figure 4:
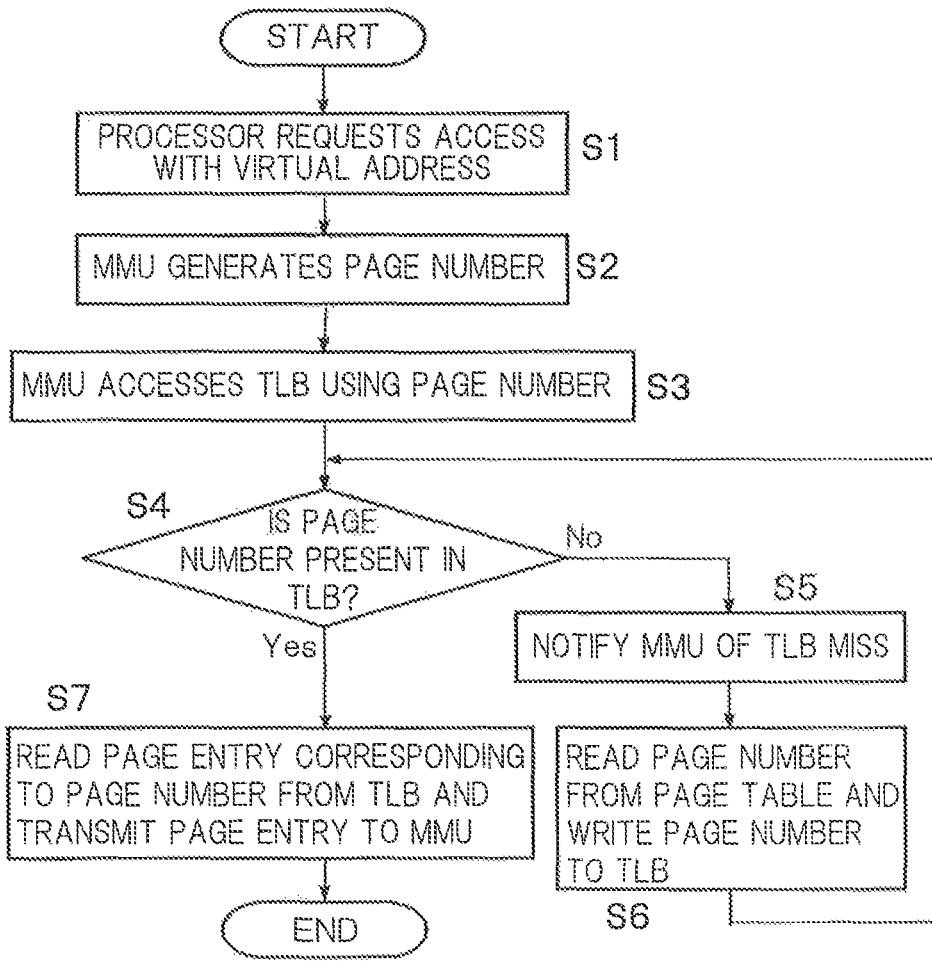
FIG. 4 is a flowchart illustrating an example of an address conversion process using a TLB 7.

FIG. 4 is a flowchart illustrating an example of an address conversion process using the TLB 7. First, when the processor 3 requests memory access with a virtual address (step S1), the MMU 5 receives the virtual address and generates a page number for referring to the TLB 7 (step S2). Then, the MMU 5 accesses the TLB 7 using the generated page number (step S3). When receiving the page number from the MMU 5, a TLB controller 15 (not illustrated in FIG. 1) checks whether the page number is present in the TLB 7 (step S3). When the page number is not present in the TLB 7, the TLB controller 15 notifies the MMU 5 of a TLB miss (step S4).

When a TLB miss occurs, the MMU 5 performs a process corresponding to the TLB miss on the basis of an architecture design policy for the processor 3. For example, the MMU 5 accesses the page table 6 and writes the access result to the TLB 7 (step S5). Then, the MMU 5 returns to step S3 and accesses the TLB 7 again.

On the other hand, when it is checked in step S3 that the page number is present in the TLB 7, the TLB controller 15 determines a TLB hit, reads a page entry corresponding to the page number from the TLB 7, and transmits the page entry to the MMU 5 (step S6).

The MMU 5 combines the page frame number 13 included in the page entry information 12 with a page offset to generate a physical address (step S7).

Figure 5:
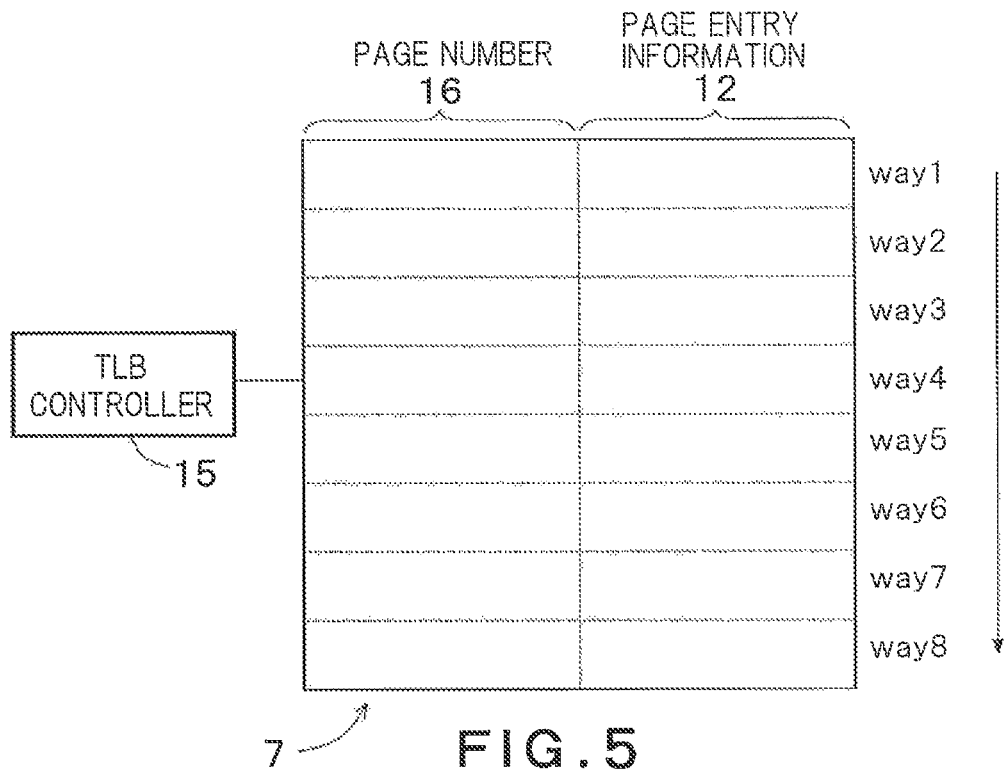
FIG. 5 is a diagram illustrating an example of the data structure of the TLB 7.

FIG. 5 is a diagram illustrating an example of the data structure of the TLB 7. The TLB 7 illustrated in FIG. 5 has an 8-way full associative structure and is accessed by the TLB controller 15. In the TLB 7 illustrated in FIG. 5, a page number 16 which is a portion of the virtual address and the page entry information 12 illustrated in FIG. 4 are stored for each way so as to be associated with each other. For example, when the virtual address is 64 bits and a page size is 4K bytes, the upper 52 bits of the virtual address are used as the page number 16 and the lower 12 bits thereof are used as the page offset.

Figure 6:
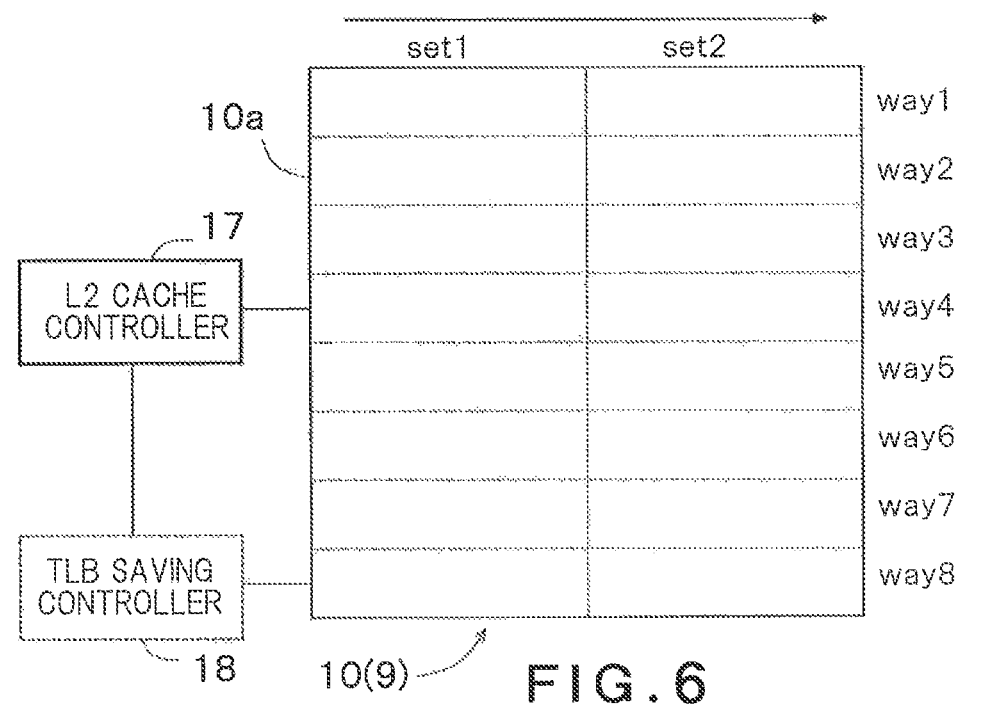
FIG. 6 is a diagram illustrating an example of a data structure when the non-volatile memory 10 illustrated in FIG. 1 is used as the L2 cache 9.

FIG. 6 is a diagram illustrating an example of a data structure when the nonvolatile memory 10 illustrated in FIG. 1 is used as the L2 cache 9. FIG. 6 illustrates a set associative structure in which the number of sets is 2 and the number of ways is 8. The number of sets and the number of ways are not limited to those illustrated in FIG. 6. For example, the set is selected by a first address bit group in the physical address and the way is selected by a second address bit group which is lower than the first address bit group in the physical address.

As illustrated in FIG. 6, the non-volatile memory 10 includes a non-volatile memory region 10*a*, an L2 cache controller 17, and a TLB saving controller 18. When the non-volatile memory 10 is used as the L2 cache 9, the L2 cache controller 17 controls access to the L2 cache 9. The TLB saving controller 18 performs a control process of saving (storing) information stored in the TLB 7 to the non-volatile memory 10 when power is turned off. The TLB saving controller 18 may be integrated with the power management controller 11 illustrated in FIG. 1.

When the MMU 5 turns off power, the TLB saving controller 18 saves (stores) the page number and the page entry information 12 stored in the TLB 7 to the non-volatile memory 10 which is used as the L2 cache 9. The information stored in the TLB 7 is not necessarily limited to that illustrated in FIG. 3. However, at least address conversion information for converting a virtual address into a physical address is stored in the TLB 7. Therefore, when the MMU 5 turns off power, the TLB saving controller 18 saves (stores) at least the address conversion information stored in the TLB 7 to the non-volatile memory 10.

Specifically, when the MMU 5 turns off power, the TLB saving controller 18 saves (stores) the information stored in the TLB 7 to, for example, one or a plurality of ways in the non-volatile memory 10 in response to an instruction from the power management controller 11. That is, the TLB saving controller 18 saves (stores) the information stored in the TLB 7 to each way, which is a unit, in the non-volatile memory 10. Alternatively, the TLB saving controller 18 may save the information stored in the TLB 7 to each set which is a unit. In this embodiment, the way is used as a unit. The reason why the way is used as a unit is as follows. The L2 cache controller 17 accesses each way of the L2 cache 9. Therefore, even when some ways are invalidated and allocated to the TLB 7, it is not necessary to invalidate the other ways and there is no problem in accessing the L2 cache 9.

When the non-volatile memory 10 does not have a way structure, the information stored in the TLB 7 may be saved (stored) to a predetermined memory region.

Figure 7:
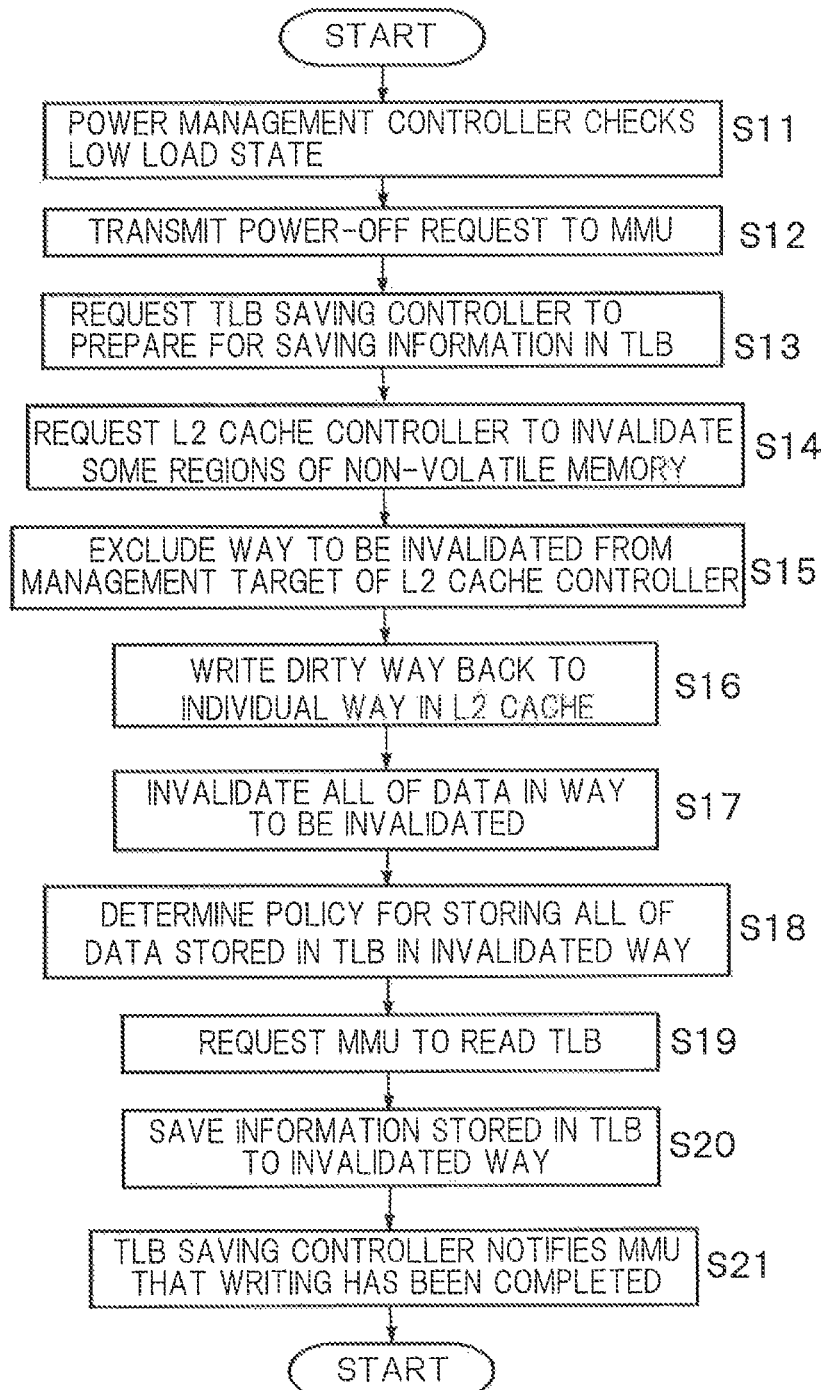
FIG. 7 is a flowchart illustrating an example of a processing operation when an MMU 5 turns off power.

FIG. 7 is a flowchart illustrating an example of a processing operation when the MMU 5 turns off power. The power management controller 11 monitors, for example, the operating state of the processor 3. When recognizing that the processor 3 is in a low load state (step S11), the power management controller 11 transmits a power-off request to the MMU 5 (step S12). The power management controller 11 may be mounted in various ways. For example, the power management controller 11 may be implemented by software, such as an OS executed by the processor 3, or may be a dedicated module which is a hardware component provided separately from the processor 3. In addition, the power management controller 11 may be a hybrid structure of software and hardware. The power management controller 11 may have the functions of an interrupt controller, or it may receive interrupt information from an interrupt controller and perform power management. When receiving the request, the MMU 5 requests the TLB saving controller 18 to prepare for saving the information in the TLB 7 (step S13).

The TLB saving controller 18 requests the L2 cache controller 17 to invalidate some regions of the non-volatile memory 10 (step S14). When receiving the request, the L2 cache controller 17 invalidates one or a plurality of ways in the non-volatile memory 10 and excludes the invalidated way or ways from a management target of the L2 cache controller 17 (step S15).

Figure 8:
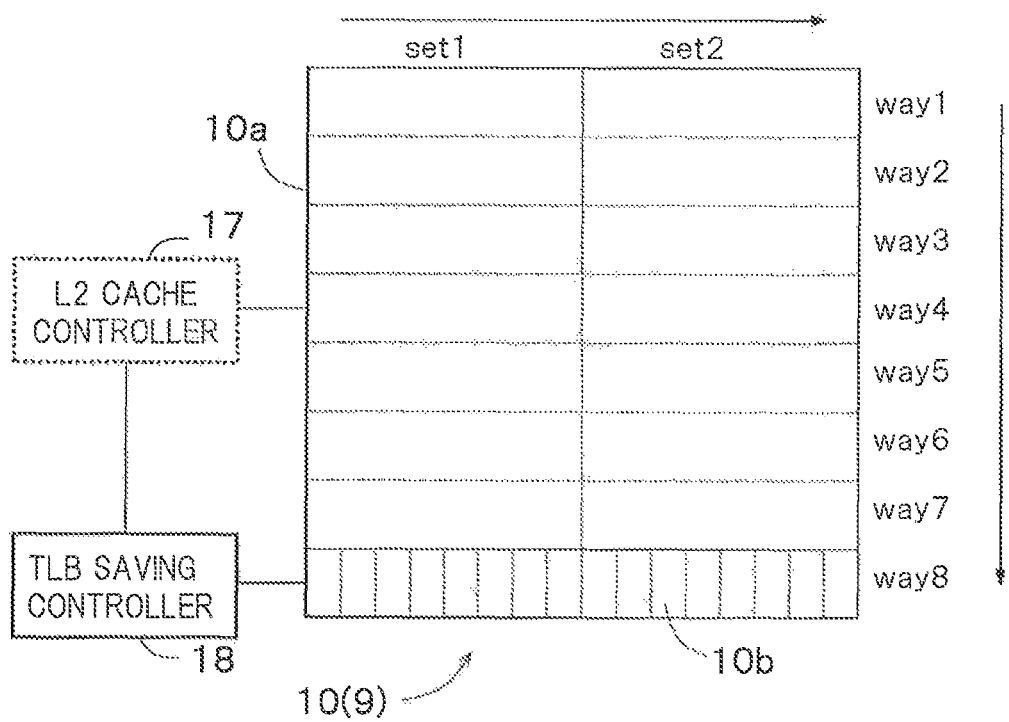
FIG. 8 is a diagram illustrating an example in which way 8 is invalidated.

When invalidating some ways, the L2 cache controller 17 preferentially invalidates, for example, a region having a low frequency of access, that is, a way in the vicinity of a least recently used (LRU) region. FIG. 8 illustrates an example in which way 8 is invalidated. The L2 cache controller 17 writes dirty data stored in way 8 back to the main memory 4 (step S16). Then, the L2 cache controller 17 invalidates all of data which is stored in way 8 and decrements (or increments) the value of a valid way register (not illustrated) from 8 to 7 (step S17).

Then, the TLB saving controller 18 recognizes the memory region of way 8 in the non-volatile memory 10 as a region for storing the page number and the page entry information 12 in the TLB 7 according to a policy that is set during design. Then, the TLB saving controller 18 determines a policy for storing all of the data stored in the TLB 7 in the order of the addresses from the head region of way 8 (step S18). For example, when the TLB 7 has an 8-way full associative structure as illustrated in FIG. 5, the TLB saving controller 18 stores the page number and the page entry information 12 of way 1 in the TLB 7 in the head region of way 8 in the non-volatile memory 10 and sequentially stores the page number and the page entry information 12 of ways 2 to 8 in the TLB 7 in the non-volatile memory 10.

The number of ways used to store the information of time TLB 7 in the non-volatile memory 10 depends on, for example, the data size of the way or the data size of the TLB 7. For example, in a case in which one line of the non-volatile memory 10 is 64 bytes, when one way (two lines) of the non-volatile memory 10 is used to store the information of the TLB 7, the data size of one way is 128 bytes (=64×2). When the page number of the TLB 7 is 52 bits, the page entry information 12 of the TLB 7 is 64 bits, and the number of ways is 8, a data size of 12 bytes (=128−(52+64)×8/8) remains. The remaining region may not be managed by the TLB saving controller 18, or it may be recognized as an empty region and may be used for other purposes.

The TLB saving controller 18 requests the MMU 5 to read information from the TLB 7 (step S19). When the MMU 5 reads information from the TLB 7 in response to the request, the TLB saving controller 18 stores the read information in an invalid region of the non-volatile memory 10 (step S20). When the storage of information from the TLB 7 to the non-volatile memory 10 ends, the TLB saving controller 18 notifies the MMU 5 that writing has been completed (step S21). Finally, the MMU 5 turns off the TLB 7.

Figure 9:
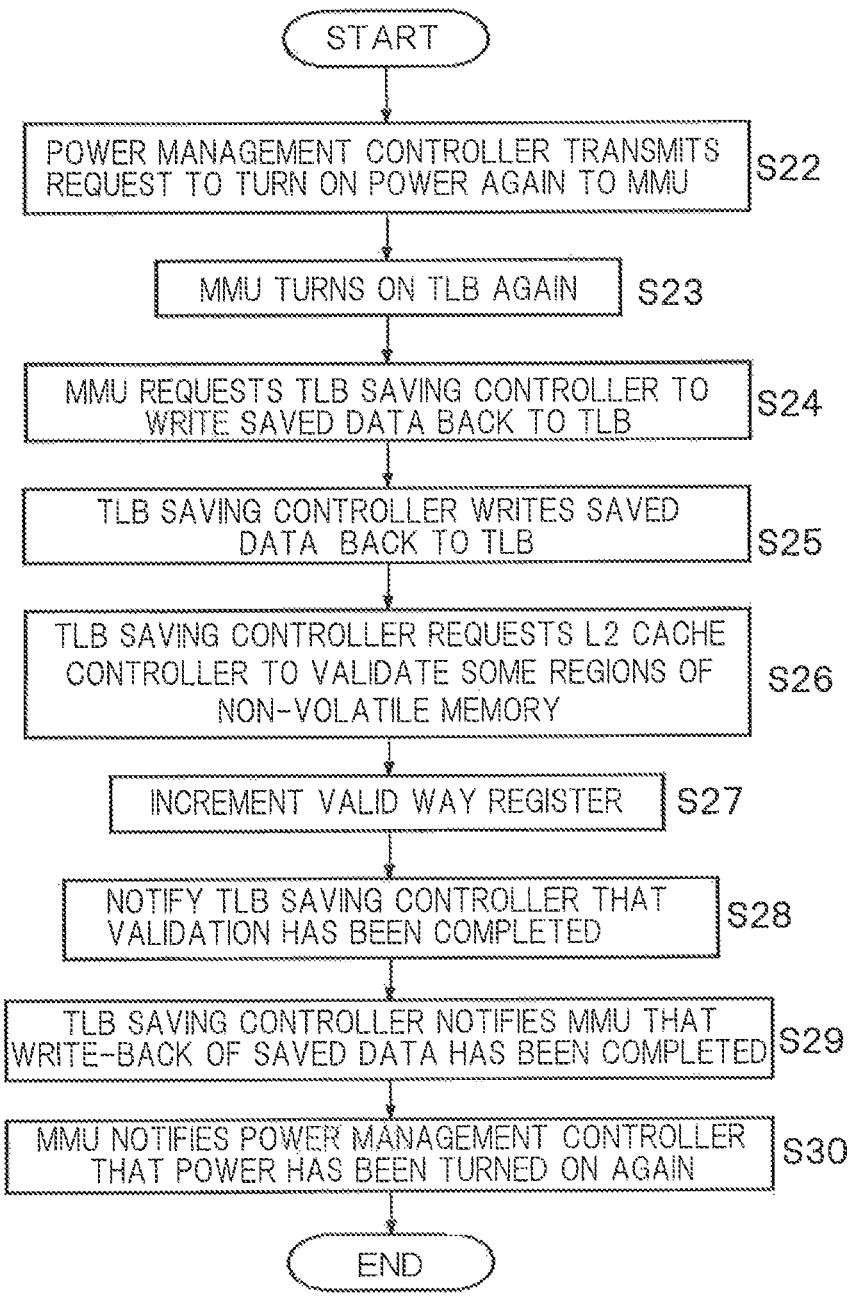
FIG. 9 is a flowchart illustrating an example of a processing operation when power is turned on again.

FIG. 9 is a flowchart illustrating an example of a processing operation when power is turned on again. The power management controller 11 recognizes, for example, the load state of the processor 3 and transmits a request to turn on power again to the MMU 5 (step S22). When receiving the request, the MMU 5 turns on the TLB 7 again (step S23). Then, the MMU 5 requests the TLB saving controller 18 to write back the saved data (step S24). The TLB saving controller 18 writes the saved data back to the TLB 7 (step S25). When the write-back is completed, the TLB saving controller 18 requests the L2 cache controller 17 to validate some regions of the non-volatile memory 10 (step S26). The L2 cache controller 17 validates one or a plurality of invalidated ways of the non-volatile memory 10, increments (or decrement) the value of the valid way register (not illustrated) from 7 to 8 (step S27), and notifies the TLB saving controller 18 that the validation has been completed (step S28). The TLB saving controller 18 notifies the MMU 5 that the write-back of the saved data has been completed (step S29). The MMU 5 notifies the power management controller 11 that power has been turned on again (step S30).

The write-back of the saved data to the TLB 7 is not necessarily performed. When power is turned on again, it may be determined whether to perform a process of writing the saved data back to the TLB 7. When it is determined that the write-back process is not performed, power may be turned on again by the following process.

The power management controller 11 transmits a request to turn on power again to the MMU 5. The MMU 5 turns on the TLB 7 again and initializes the TLB 7. The MMU 5 notifies the power management controller 11 that power has been turned on again.

When power is turned on again, it is determined whether to write the saved data back to the TLB 7 on the basis of various criteria. For example, the criterion is whether or not write-back address conversion information is correct. When the write-back address conversion information is not correct or is likely to be incorrect, it may be determined not to perform write-back. For example, it may be checked whether data is rewritten to the page table while power is in an off state, in order to determine whether or not the write-back address conversion information is correct. In addition, it may be checked whether the page table related to an address space including the saved address conversion information has been rewritten. For example, an administrator, such as an OS, may store information indicating whether the page table has been rewritten in a power-off state, and may not write back the saved data when power is turned again in a case in which it is determined that the page table has been rewritten. For example, an administrator, such as an OS, may store the ID of an address space of the address conversion information which is present in the TLB when power is turned off, store the ID of an address space in which the page table has been rewritten in a power-off state, and may not write back the saved data at the time power is turned on again when these IDs are identical to each other.

For example, the criterion is whether or not the write-back address conversion information is used after power is turned on again (a TLB hit occurs after write-back). When the write-back address conversion information is not used or the possibility that the write-back address conversion information will not be used is high after power is turned on again, write-back may not be performed. For example, it may be checked whether the processor uses the address space including the saved address conversion information immediately after power is turned on again in order to determine whether the write-back address conversion information is used after power is turned on again. For example, an administrator, such as an OS, may store the ID of the address space of the address conversion information which is present in the TLB 7 when power is turned off. In a case in which the program which is executed by the processor 3 does not access the address space with the ID when power is turned on again, the saved data may not be written back when power is turned on again. An administrator, such as an OS, may determine the ID of the address space to be accessed by the program executed by the processor 3 on the basis of a process ID of the program which is executed.

The write-back of the saved data may be triggered by access to the TLB 7 after power is turned on again. For example, write-back is performed as follows.

The MMU 5 turns on the TLB 7 again and initializes the TLB 7. The MMU 5 notifies the power management controller 11 that the TLB 7 has been turned on again. The processor 3 starts to execute the program and requests the MMU 5 to perform address conversion. When a miss occurs in TLB 7, the TLB 7 inquires of the TLB saving controller 18 whether desired address conversion information is present. The TLB saving controller 18 checks whether the requested address conversion information is present. When the requested address conversion information is present, the TLB saving controller 18 transmits the saved TLB entry to the TLB controller 15. The TLB controller 15 writes the saved TLB entry to the TLB and transmits the address conversion information to the MMU 5.

As such, in the first embodiment, at least a portion of the non-volatile memory 10 which can be used as the L2 cache 9 is used to store, for example, the page entry information 12 stored in the TLB 7 when the MMU 5 turns off power. Therefore, even though a volatile memory, such as an SRAM, is used as the TLB 7, information in the TLB 7 is not erased when power is turned off. As a result, the problem that a TLB miss increases after power is turned again does not arise and it is possible to improve the processing performance of the processor 3.

Second Embodiment

Figure 10:
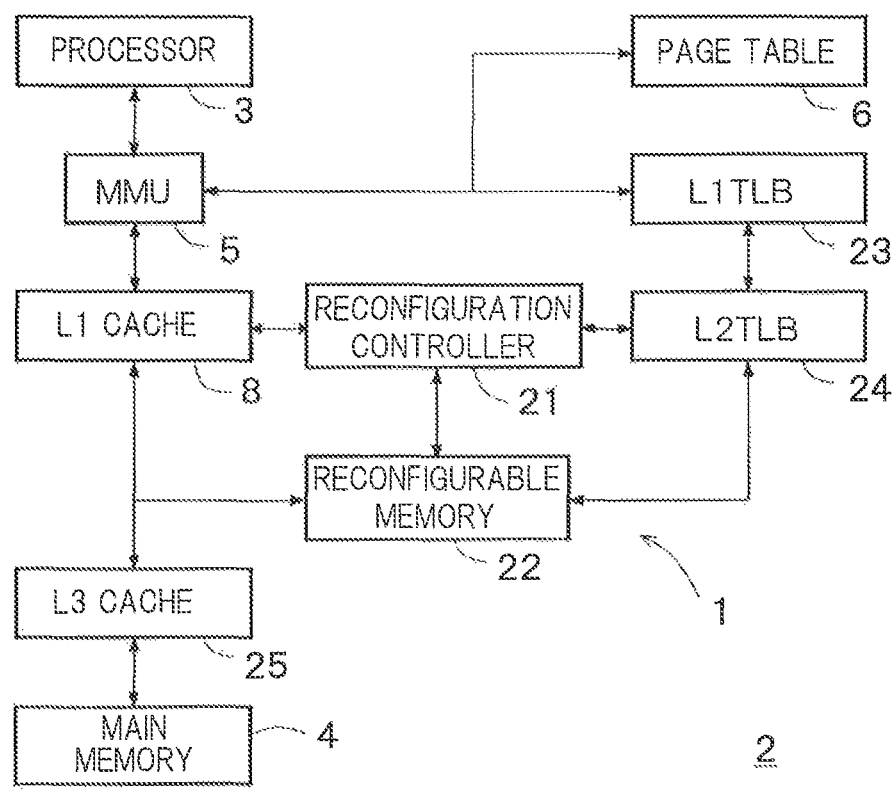
FIG. 10 is a block diagram schematically illustrating the structure of a processor system 2 including a memory system 1 according to a second embodiment.

FIG. 10 is a block diagram schematically illustrating the structure of a processor system 2 including a memory system 1 according to a second embodiment. The memory system 1 illustrated in FIG. 10 includes an MMU 5, a page table 6, an L1 cache (second cache memory) 8, a reconfiguration controller 21, a reconfigurable memory 22, an L1 TLB 23, an L2 TLB (first translation lookaside buffer) 24, and an L3 cache 25.

The L1 cache 8, the L2 TLB 23, and the L2 TLB 24 are, for example, a volatile memory such as an SRAM. Each of the reconfigurable memory 22 and the L3 cache 25 is a non-volatile memory 10 such as an MRAM.

The reconfigurable memory 22 can be used as an L2 cache 9 or an L3 TLB (second translation lookaside buffer) 20. The reconfiguration controller (third control circuitry) 21 can determine whether the reconfigurable memory 22 is used as the L2 cache 9 or the L3 TLB 20.

When the reconfigurable memory 22 is used as the L2 cache 9, the L1 cache 8, the L2 cache 9, and the L3 cache 25 may manage data according to an inclusion policy. In this case, all of data stored in the L1 cache 8 is stored in the L2 cache 9 and all of data stored in the L2 cache 9 is stored in the L3 cache 25. Alternatively, the L1 cache 8, the L2 cache 9, and the L3 cache 25 may manage data according to an exclusion policy. In this case, data items stored in the L1 cache 8, the L2 cache 9, and the L3 cache 25 do not overlap each other. The inclusion policy and the exclusion policy may be combined with each other. For example, the L1 cache 8 and the L2 cache 9 may be based on the exclusive policy and the L2 cache 9 and the L3 cache 25 may be based on the inclusion policy.

The write policy of the L1 cache 8, the L2 cache 9, and the L3 cache 25 during a write hit may be a write-through policy or a write-back policy. In addition, the write policy of the L1 cache 8, the L2 cache 9, and the L3 cache 25 during a write miss may be a write-allocate policy or a no-write-allocate policy.

The memory size of the L2 cache 9 is equal to or greater than the memory size of the L1 cache 8 and the memory size of the L3 cache 25 is equal to or greater than the memory size of the L2 cache 9.

In FIG. 10, a three-level cache memory including the L3 cache 25 is illustrated. However, this embodiment is not limited thereto. Four or more levels of high-order cache memories may be provided or a two-level cache memory may be provided.

Each of the L1 TLB 23 and the L2 TLB 24 is a hierarchical TLB. For example, the memory size of the L2 TLB 24 is greater than the memory size of the L1 TLB 23 and the L1 TLB 23 is preferentially accessed over the L2 TLB 24. The L1 TLB 23 has, for example, the full associative structure illustrated in FIG. 5. The L2 TLB 24 has, for example, a set associative structure.

The reconfiguration controller 21 switches the mode between a cache mode (first mode) in which the reconfigurable memory 22 functions as the L2 cache 9 and a TLB mode (second mode) in which the reconfigurable memory 22 functions as the L3 TLB 20.

In the example illustrated in FIG. 10, the reconfiguration controller 21 is connected to the L1 cache 8 and the L2 TLB 24. The reconfigurable memory 22 receives an access request from the L1 cache 8 or the L2 TLB 24 under the control of the reconfiguration controller 21.

Figure 11:
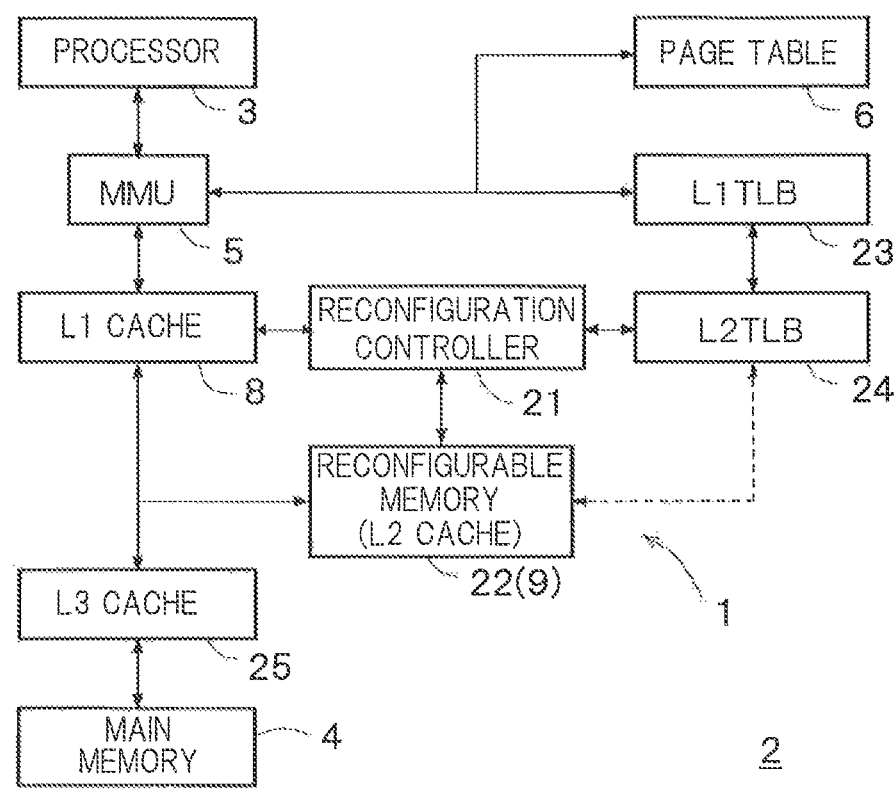
FIG. 11 is a diagram illustrating a memory structure in a cache mode.

FIG. 11 is a diagram illustrating a memory structure in the cache mode. When a miss occurs in the L1 cache 8, the L1 cache 8 transmits an access request to the reconfigurable memory 22 which functions as the L2 cache 9. When a cache miss occurs, the reconfigurable memory 22 transmits an access request to the L3 cache 25.

Figure 12:
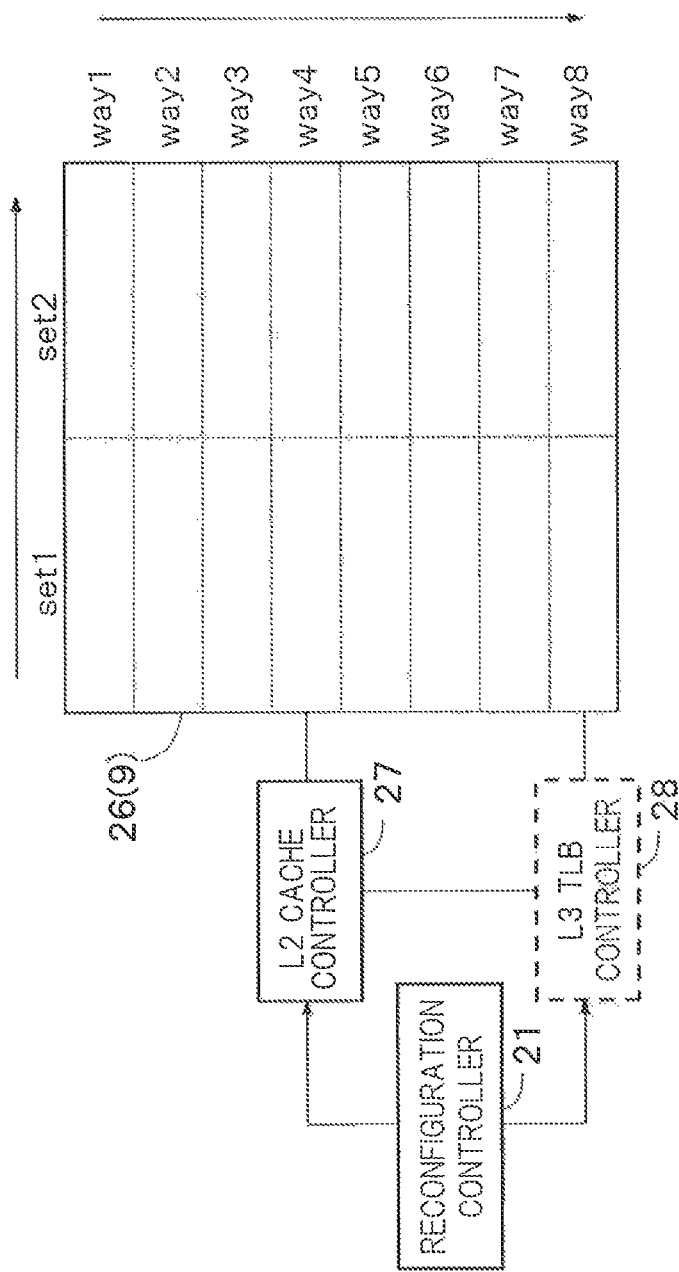
FIG. 12 is a diagram illustrating the data structure of a reconfigurable memory 22 in the cache mode.

FIG. 12 is a diagram illustrating the data structure of the reconfigurable memory 22 in the cache mode. As illustrated in FIG. 12, the reconfigurable memory 22 includes a reconfigurable memory array 26, an L2 cache controller 27, and an L3 TLB controller (second control circuitry) 28. In the cache mode, the reconfigurable memory array 26 is used as the L2 cache 9 and the L2 cache controller 27 controls access to the L2 cache 9. The L3 TLB controller 28 is stopped in the cache mode.

In the cache mode, the entire region of the reconfigurable memory array 26 functions as the L2 cache 9. In the example illustrated in FIG. 12, the reconfigurable memory array 26 has a set associative structure including two sets and eight ways.

Figure 13:
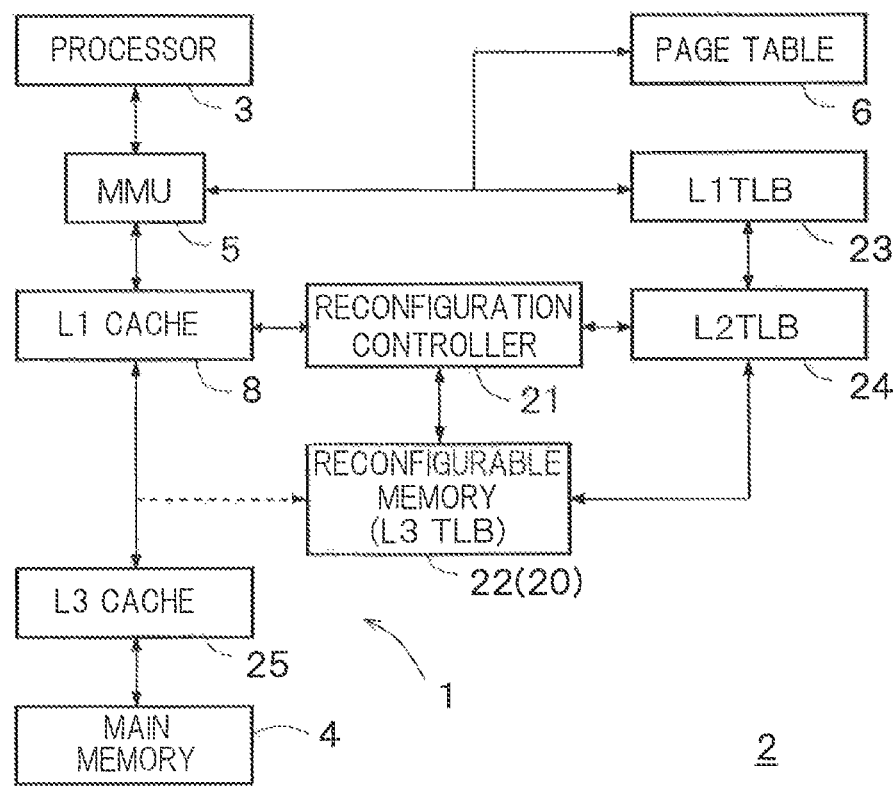
FIG. 13 is a diagram illustrating a memory structure in a TLB mode.

FIG. 13 is a diagram illustrating a memory structure in the TLB mode. In the TLB mode, when a miss occurs in the L2 TLB 24, the L2 TLB 24 transmits an access request to the reconfigurable memory 22 which functions as the L3 TLB 20. When a miss occurs in the L3 TLB 20 in the reconfigurable memory 22, the MMU 5 determines the miss as a TLB miss and accesses the page table 6.

Figure 14:
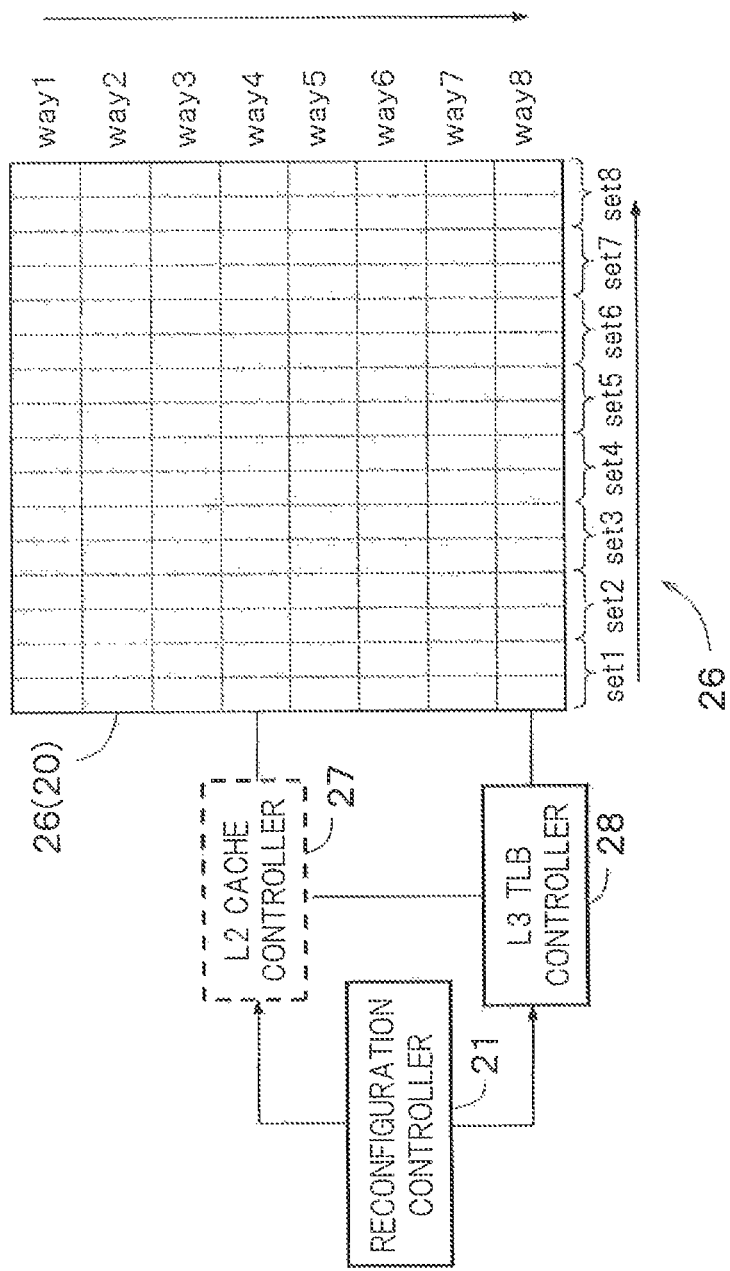
FIG. 14 is a diagram illustrating the data structure of the reconfigurable memory 22 in the TLB mode.

FIG. 14 is a diagram illustrating the data structure of the reconfigurable memory 22 in the TLB mode. In the TLB mode, the reconfigurable memory 22 functions as the L3 TLB 20. Therefore, in the example illustrated in FIG. 14, the reconfigurable memory 22 has a set associative structure including eight sets and eight ways. The L3 TLB controller 28 controls the L3 TLB 20 and the L2 cache controller 27 is stopped.

In the L3 TLB 20 illustrated in FIG. 14, each set in each way includes a region which stores a page number and a region which stores page entry information 12. For example, in the set associative structure including eight sets, it is possible to reduce the information of the page number stored in the region which stores the page number by a maximum of 3 bits, as compared to the full associative structure. That is, for example, a 3-bit reduced page number tag may be stored in the region which stores the page number.

Figure 15:
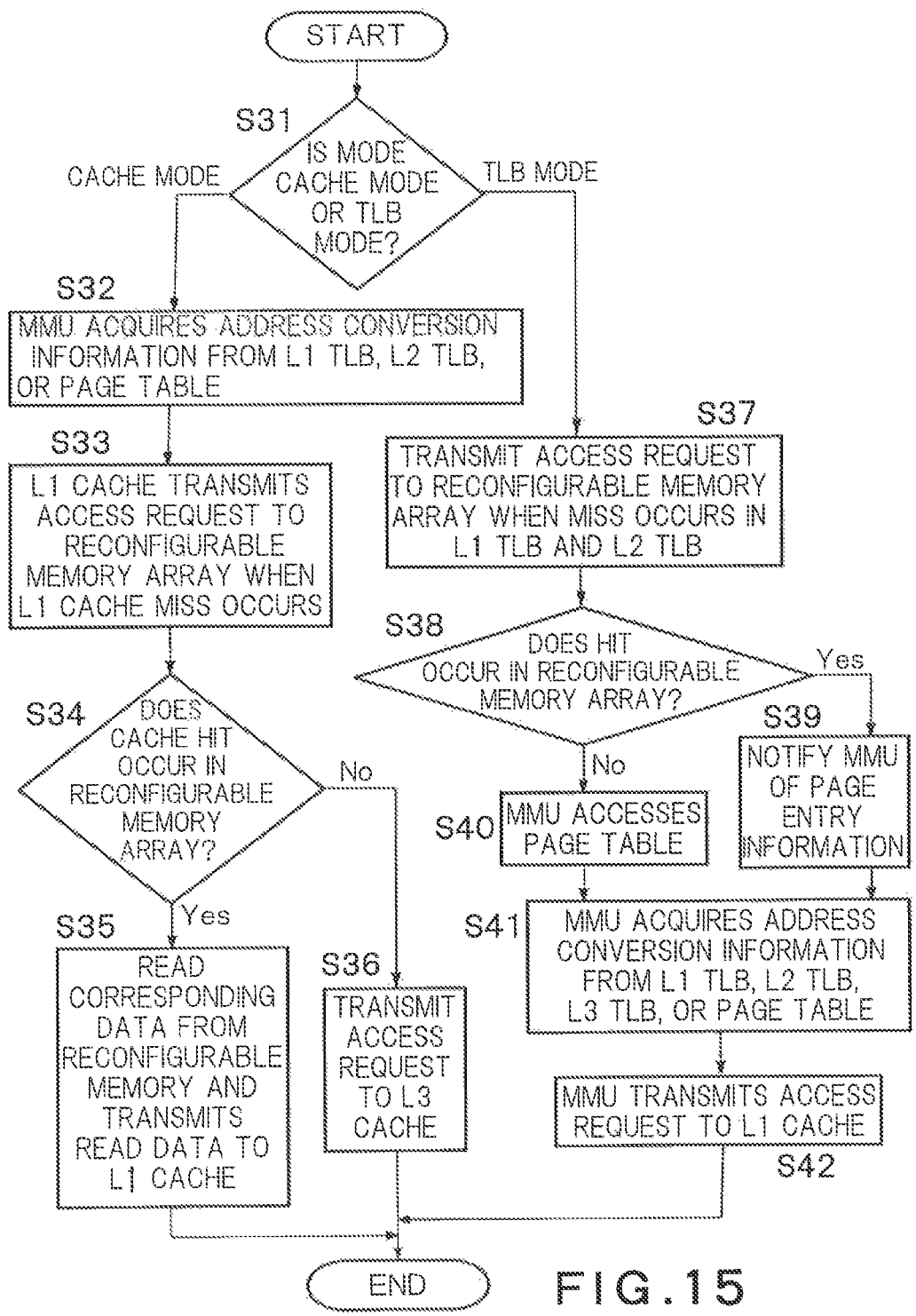
FIG. 15 is a flowchart illustrating an example of a process of the memory system 1 according to the second embodiment.

FIG. 15 is a flowchart illustrating an example of the process of the memory system 1 according to the second embodiment.

First, the reconfigurable memory 22 selects the cache mode or the TLB mode (step S31). When selecting the mode, the reconfigurable memory 22 refers to, for example, a cache miss rate or a TLB miss rate.

When the cache mode is selected and a miss occurs in both the L1 TLB 23 and the L2 TLB 24, the miss is determined to be a TLB miss and the MMU 5 accesses the page table 6 (step S32).

The MMU 5 transmits an access request to the L1 cache 8, using the address conversion information acquired from the L1 TLB 23, the L2 TLB 24, or the page table 6. When a miss occurs in the L1 cache 8, the L1 cache 8 transmits an access request to the reconfigurable memory 22 (step S33). The reconfigurable memory 22 which functions as the L2 cache 9 checks whether a cache hit occurs (step S34). When a cache hit occurs, data is read from the reconfigurable memory 22 and is then transmitted to the L1 cache 8 (step S35). When a cache miss occurs in step S35, the reconfigurable memory 22 transmits an access request to the L3 cache 25 (step S36).

In a case in which the TLB mode is selected in step S31, when a hit occurs in the L1 TLB 23 or the L2 TLB 24, the process proceeds to step S41 which will be described below. When a miss occurs in both the L1 TLB 23 and the L2 TLB 24, the L2 TLB 24 transmits an access request to the reconfigurable memory 22 which functions as the L3 TLB 20 (step S37).

The L3 TLB controller 28 determines whether there is the page entry information 12 corresponding to the L3 TLB 20 (step S38). When there is the page entry information 12 corresponding to the L3 TLB 20, a TLB hit occurs and the L3 TLB controller 28 notifies the MMU 5 of the page entry information 12 (step S39). When there is no page entry information 12 corresponding to the L3 TLB 20, a TLB miss occurs and the MMU 5 accesses the page table 6 (step S40).

The MMU 5 acquires address conversion information from the L1 TLB 23, the L2 TLB 24, the L3 TLB 20, or the page table 6 (step S41) and fills the L3 TLB 20, the L2 TLB 24, and the L1 TLB 23 with the acquired address conversion information (writes the acquired address conversion information to the L3 TLB 20, the L2 TLB 24, and the L1 TLB 23). The L2 TLB 24 may eject (write) the address conversion information, which is overwritten and erased during a filling process, to the L3 TLB 20. The MMU 5 transmits an access request to the L1 cache 8, using the address conversion information acquired from the L1 TLB 23 (step S42). When a miss occurs in the L1 cache 8, the L1 cache 8 transmits an access request to the L3 cache 25.

The data structure illustrated in FIG. 14 is illustrative and the number of sets or the number of ways is arbitrary. In addition, the reconfigurable memory 22 does not necessarily have the set associative structure. The reconfigurable memory 22 may have a full associative structure or a direct map structure according to circumstances.

Figure 16:
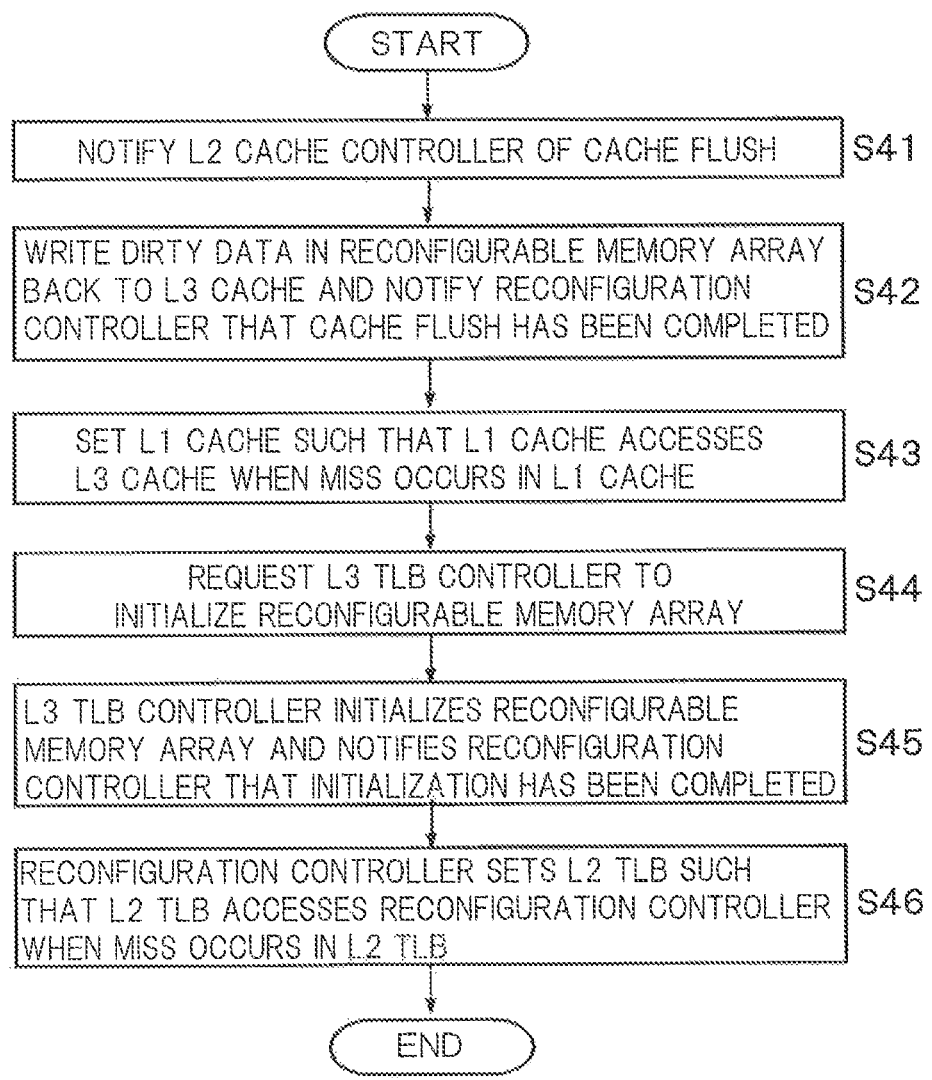
FIG. 16 is a flowchart illustrating an example of a process which changes the mode from the cache mode to the TLB mode.

FIG. 16 is a flowchart illustrating an example of a process of changing the mode from the cache mode to the TLB mode. The reconfiguration controller 21 requests the L2 cache controller 27 to perform cache flush (step S41). The L2 cache controller 27 writes dirty data in the reconfigurable memory 22, which is used as the L2 cache 9, back to the L3 cache 25 and notifies the reconfiguration controller 21 that cache flush has been completed (step S42).

The reconfiguration controller 21 sets the L1 cache 8 such that the L1 cache 8 accesses the L3 cache 25 when a cache miss occurs in the L1 cache 8 (step S43). At the same time, the reconfiguration controller 21 requests the L3 TLB controller 28 to initialize the reconfigurable memory 22 in order to use the reconfigurable memory 22 as the L3 TLB 20 (step S44).

The L3 TLB controller 28 initializes the reconfigurable memory 22 and notifies the reconfiguration controller 21 that the initialization has been completed (step S45). The reconfiguration controller 21 sets the L2 TLB 24 such that the L2 TLB 24 accesses the reconfiguration controller 21 when a miss occurs in the L2 TLB 24 (step S46).

Figure 17:
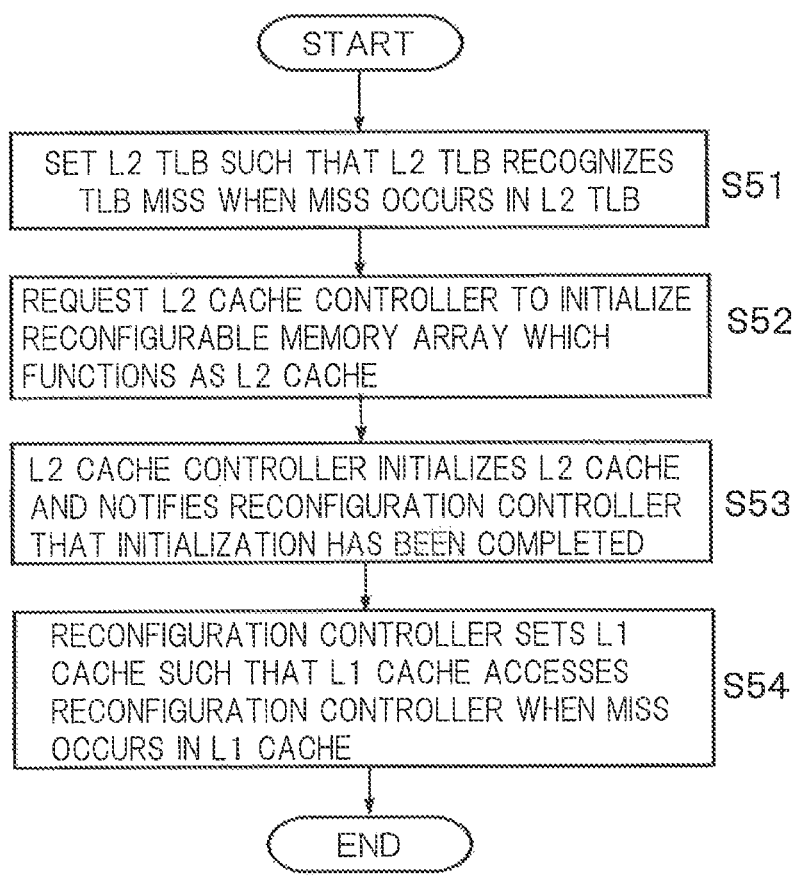
FIG. 17 is a flowchart illustrating an example of a process which changes the mode from the TLB mode to the cache mode.

FIG. 17 is a flowchart illustrating an example of a process of changing the mode from the TLB mode to the cache mode. The reconfiguration controller 21 directs the L2 TLB controller to set the L2 TLB 24 such that a TLB miss is recognized when a miss occurs in the L2 TLB 24 (step S51). Then, the reconfiguration controller 21 requests the L2 cache controller 27 to initialize the reconfigurable memory 22 which functions as the L2 cache 9 (step S52). The L2 cache controller 27 initializes the L2 cache 9 and notifies the reconfiguration controller 21 that the initialization has been completed (step S53). The reconfiguration controller 21 sets the L1 cache 8 such that the L1 cache 8 accesses the reconfiguration controller 21 when a miss occurs in the L1 cache 8 (step S54).

(Criteria for Mode Change)

The reconfiguration controller 21 changes the mode between the cache mode and the TLB mode on the basis of, for example, the following criteria.

1. In a case in which the reconfigurable memory 22 is used as the L2 cache 9, when an L2 TLB miss has a great effect on the processing performance of the processor 3, the reconfiguration controller 21 changes the mode to the TLB mode. For example, when it is determined that the improvement of the processing performance by the cache hit frequency of the L2 cache 9 is less than the deterioration of the processing performance by the miss frequency information of the L2 TLB 24, the reconfiguration controller 21 may change the mode to the TLB mode. Specifically, when the miss frequency information of the L2 TLB 24 is equal to or greater than a set threshold value and the cache hit frequency information of the L2 cache 9 is equal to or less than the set threshold value, the reconfiguration controller 21 may change the mode to the TLB mode. The miss frequency information of the L2 TLB 24 may be directly compared with the hit frequency information of the L2 cache 9. For example, when the miss frequency information of the L2 TLB 24 is more than the hit frequency information of the L2 cache 9, the reconfiguration controller 21 may change the mode to the TLB mode.

2. In a case in which the reconfigurable memory 22 is used as the L3 TLB 20, when a cache miss which occurs in the L1 cache 8 has a great effect on the processing performance of the processor 3, the reconfiguration controller 21 changes the mode to the cache mode. For example, when it is determined that the improvement of the processing performance by the hit frequency information of the L3 TLB 20 is less than the improvement of the processing performance by information about the predicted frequency of miss of the L1 cache 8 and the predicted frequency of hit of the L2 cache 9, the reconfiguration controller 21 changes the mode to the cache mode. Specifically, when the hit frequency information of the L3 TLB 20 is equal to or less than a set threshold value and the predicted hit frequency information of the L2 cache 9 is equal to or greater than the set threshold value, the reconfiguration controller 21 may change the mode to the cache mode. The hit frequency information of the L3 TLB 20 may be directly compared with the predicted hit frequency information of the L2 cache 9. For example, when the hit frequency information of the L3 TLB 20 is less than the predicted hit frequency information of the L2 cache 9, the reconfiguration controller 21 may change the mode to the cache mode.

The predicted hit frequency information of the L2 cache 9 can be measured using, for example, the cache tag of the L2 cache controller 27 which is invalidated in the TLB mode. In this case, for example, the L1 cache 8 may notify the L2 cache controller 27 of the address where a cache miss occurs and the L2 cache controller 27 may operate only a tag memory, without controlling the reconfigurable memory 22, and simulate a hit and a miss in the L2 cache 9.

It is considered that the hit frequency information of the cache and the TLB is quantified in various ways. For example, the hit frequency information may be the number of hits per unit time or the number of unit commands. In addition, the hit frequency information may be the degree of improvement of the processing performance by a hit. The degree of improvement of the processing performance by a hit can be calculated by, for example, multiplying the difference in latency between a target-level memory (a cache or a TLB) and a lower-level memory by the number of hits of the target-level memory per unit time. The improvement rate of the processing performance which is obtained by dividing the calculated value by a processor execution time per unit time or unit command may be used.

Figure 18:
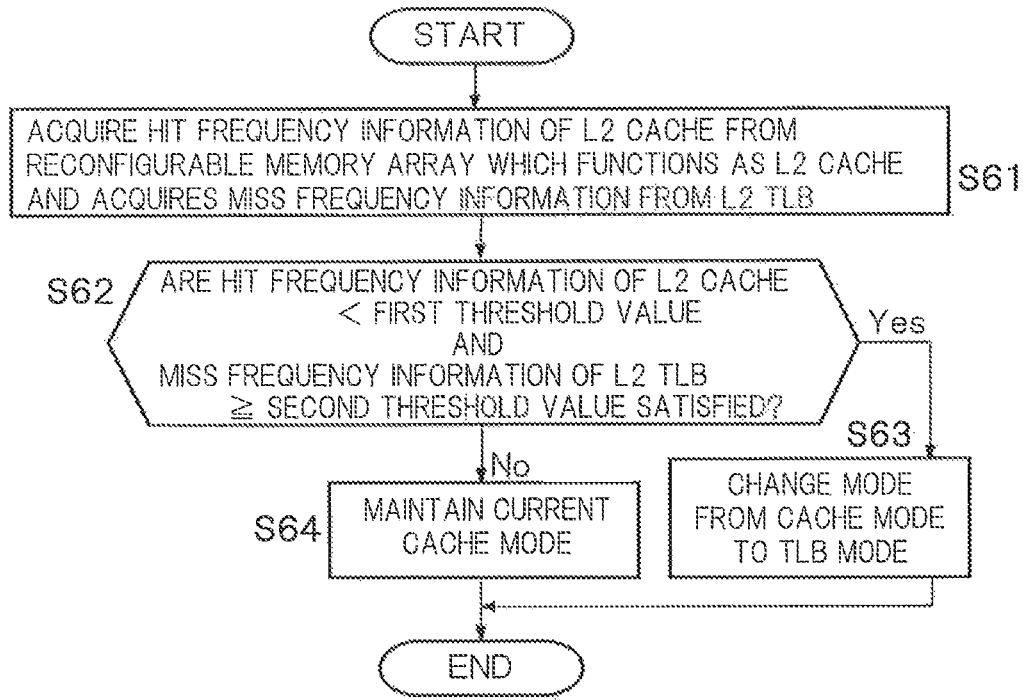
FIG. 18 is a flowchart illustrating an example of a mode change process performed by a reconfiguration controller 21 in the cache mode.

FIG. 18 is a flowchart illustrating an example of the mode change process performed by the reconfiguration controller 21 in the cache mode.

For example, in the cache mode, the reconfiguration controller 21 acquires the cache hit frequency information of the L2 cache 9 from the reconfigurable memory 22 which functions as the L2 cache 9 and acquires the miss frequency information of the L2 TLB 24 from the L2 TLB 24 (step S61).

Then, the reconfiguration controller 21 determines whether the acquired cache hit frequency information of the L2 cache 9 is less than a predetermined first threshold value and the acquired miss frequency information of the L2 TLB 24 is equal to or greater than a predetermined second threshold value (step S62).

When the determination result in step S62 is "YES", that is, when the cache hit frequency information of the L2 cache 9 is less than the first threshold value and the miss frequency information of the L2 TLB 24 is equal to or greater than the second threshold value, the reconfiguration controller 21 changes the mode from the cache mode to the TLB mode (step S63).

When the determination result in step S62 is "NO", that is, when at least the cache hit frequency information of the L2 cache 9 is equal to or greater than the first threshold value or the miss frequency information of the L2 TLB 24 is less than the second threshold value, the reconfiguration controller 21 does not change the mode and maintains the current cache mode (step S64).

Figure 19:
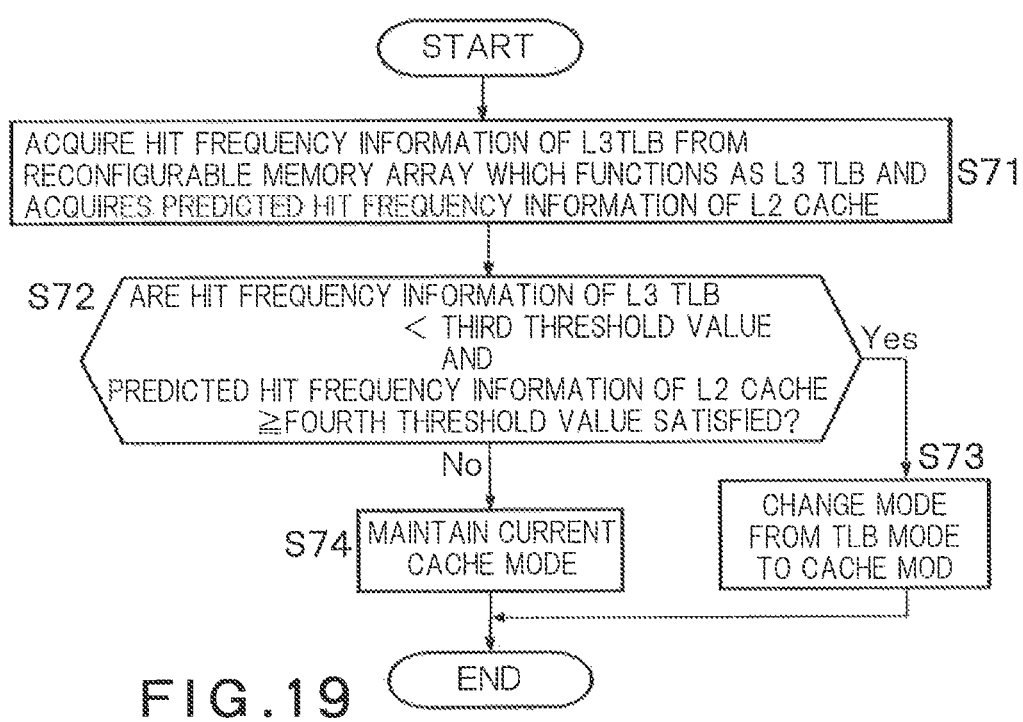
FIG. 19 is a flowchart illustrating an example of a mode change process performed by the reconfiguration controller 21 in the TLB mode.

FIG. 19 is a flowchart illustrating an example of the mode change process performed by the reconfiguration controller 21 in the TLB mode.

For example, in the TLB mode, the reconfiguration controller 21 acquires the hit frequency information of the L3 TLB 20 from the reconfigurable memory 22 which functions as the L3 TLB 20 and acquires the predicted hit frequency information of the L2 cache from the L2 cache controller 27 (step S71).

Then, the reconfiguration controller 21 determines whether the acquired hit frequency information of the L3 TLB 20 is less than a predetermined third threshold value and the acquired predicted hit frequency information of the L2 cache is equal to or greater than a predetermined fourth threshold value (step S72).

When the determination result in step S72 is "YES", that is, when the hit frequency information of the L3 TLB 20 is less than the third threshold value and the predicted cache hit frequency information of the L2 cache is equal to or greater than the fourth threshold value, the reconfiguration controller 21 changes the mode from the TLB mode to the cache mode (step S73).

When the determination result in step S72 is "NO", that is, when at least the hit frequency information of the L3 TLB 20 is equal to or greater than the third threshold value or the predicted cache hit frequency information of the L2 cache 9 is less than the fourth threshold value, the reconfiguration controller 21 does not change the mode and maintains the current TLB mode (step S74).

In FIG. 10, the reconfigurable memory 22 is used as the L2 cache 9 or the L3 TLB 20. However, the hierarchy of the cache memory and the hierarchy of the TLB allocated to the reconfigurable memory 22 are arbitrary. That is, in the cache mode, the reconfigurable memory 22 may be used as any level of cache memory among a plurality of levels of cache memories. In the TLB mode, the reconfigurable memory 22 may be used as any level of TLB among a plurality of levels of TLBs.

As such, in the second embodiment, the reconfiguration controller 21 can determine whether to use the reconfigurable memory 22, which is the non-volatile memory 10, as a cache memory or a TLB. Therefore, it is possible to further improve the processing performance of the processor 3. That is, when there are many cache misses, the reconfigurable memory 22 can be used to increase the memory size of the cache memory. Therefore, it is possible to reduce the cache misses. In addition, when there are many TLB misses, the reconfigurable memory 22 can be used to increase the capacity of the TLB. Therefore, it is possible to reduce the TLB misses.

Similarly to the first embodiment, a portion of the reconfigurable memory 22, for example, some ways can be used as the save (storage) destination of the TLB when power is turned off. Therefore, it is possible to suppress an increase in the TLB miss after power is turned on again. The reconfiguration controller 21 may control the saving (storage) of the TLB when power is turned off, or another controller (for example, the power management controller 11 illustrated in FIG. 1) may be provided in the memory system 1 illustrated in FIG. 10 and control the saving (storage) of the TLB when power is turned off. Various control policies or control methods described in the first embodiment can be applied to the saving of the TLB when power is turned off in the second embodiment.

Third Embodiment

In a third embodiment, a portion of the reconfigurable memory 22 is used as a cache memory and at least a part of the remaining portion of the reconfigurable memory 22 is used as a TLB. That is, the reconfigurable memory 22 according to the third embodiment has a hybrid structure including a cache memory region and a TLB region.

A processor system 2 including a memory system 1 according to the third embodiment has the same structure as that illustrated in FIG. 10.

Figure 20:
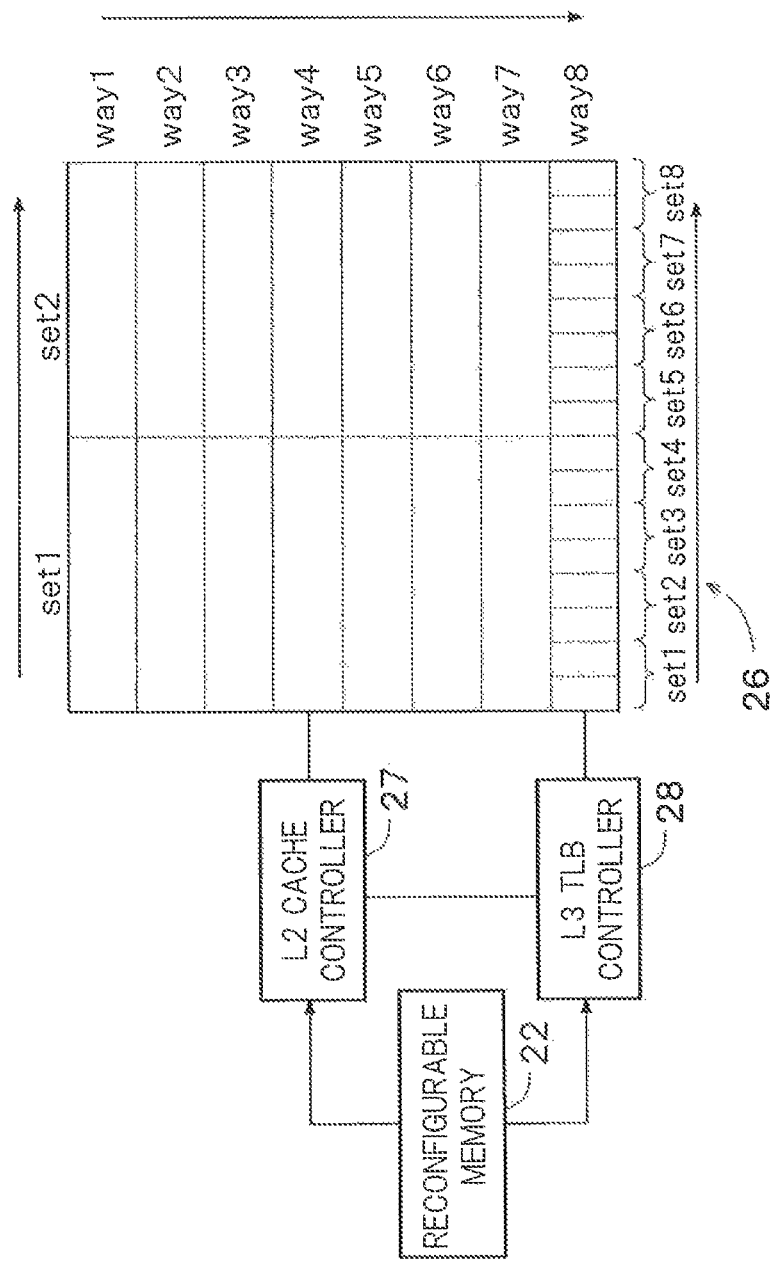
FIG. 20 is a block diagram illustrating an example of the internal structure of a reconfigurable memory 22 according to a third embodiment.

FIG. 20 is a block diagram illustrating an example of the internal structure of the reconfigurable memory 22 according to the third embodiment. The reconfigurable memory 22 illustrated in FIG. 20 includes a reconfigurable memory array 26, an L2 cache controller 27, and an L3 TLB controller 28.

In the reconfigurable memory array 26, the entire memory region can be used as the L2 cache 9 or the L3 TLB 20. In addition, a portion of the memory region can be used as the L2 cache 9 and at least a part of the remaining portion of the memory region can be used as the L3 TLB 20.

The reconfiguration controller (second controller) 21 controls the allocation of the memory region in the reconfigurable memory array 26. That is, the reconfiguration controller 21 controls whether to use at least a portion of the memory region in the reconfigurable memory array 26 as the L2 cache 9 and the L3 TLB 20.

The L2 cache controller 27 controls access to the L2 cache 9 in the reconfigurable memory array 26 and the L3 TLB controller 28 controls access to the L3 TLB 20 in the reconfigurable memory array 26.

Figure 21:
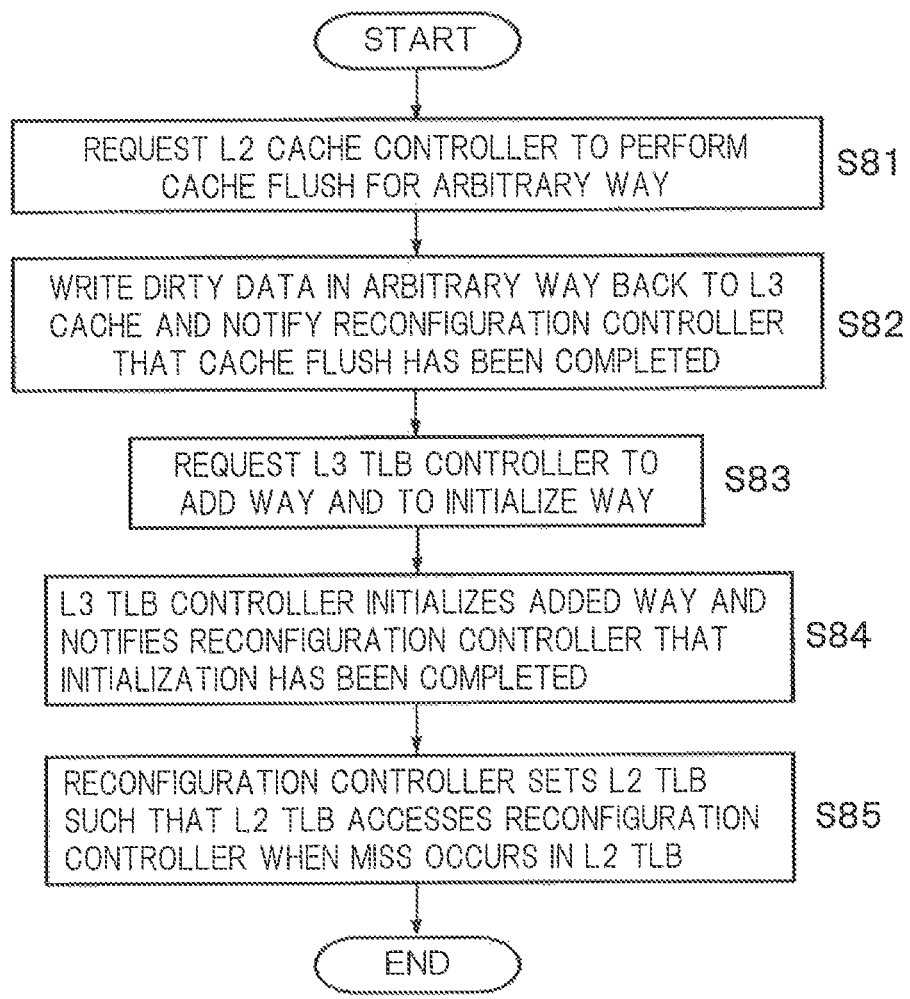
FIG. 21 is a flowchart illustrating a process which changes a portion of the reconfigurable memory from the cache mode to the TLB mode.

FIG. 21 is a flowchart illustrating a process which changes a portion of the reconfigurable memory array 26 from the cache mode to the TLB mode. First, the reconfiguration controller 21 requests the L2 cache controller 27 to perform cache flush for any way of the reconfigurable memory array 26 (step S81).

The L2 cache controller 27 writes dirty data in the way, which is a cache flush target in step S81, back to the L3 cache 25 and notifies the reconfiguration controller 21 that cache flush has been completed (step S82).

Then, the reconfiguration controller 21 requests the L3 TLB controller 28 to add a way and to initialize the way (step S83). Then, the L3 TLB controller 28 initializes the added way and notifies the reconfiguration controller 21 that initialization has been completed (step S84).

Then, the reconfiguration controller 21 sets the L2 TLB 24 such that the reconfiguration controller 21 is notified of a miss when the miss occurs in the L2 TLB 24 (step S85).

According to the process illustrated in FIG. 21, after an arbitrary way of the reconfigurable memory array 26 is changed to the TLB mode, another way can be changed to the TLB mode. This process is performed as illustrated in, for example, the flowchart of FIG. 22.

First, the reconfiguration controller 21 requests the L2 cache controller 27 to perform cache flush for a new way (step S91). Then, the L2 cache controller 27 writes dirty data in the way, which is a cache flush target in step S91, back to the L3 cache 25 and notifies the reconfiguration controller 21 that cache flush has been completed (step S92). Then, the same process as that from steps S83 to S85 is performed (steps S93 to S95).

In this way, it is possible to increase the ways in the TLB mode in the reconfigurable memory array 26. In addition, it is possible to change the ways in the TLB mode in the reconfigurable memory array 26 to the cache mode.

Figure 23:
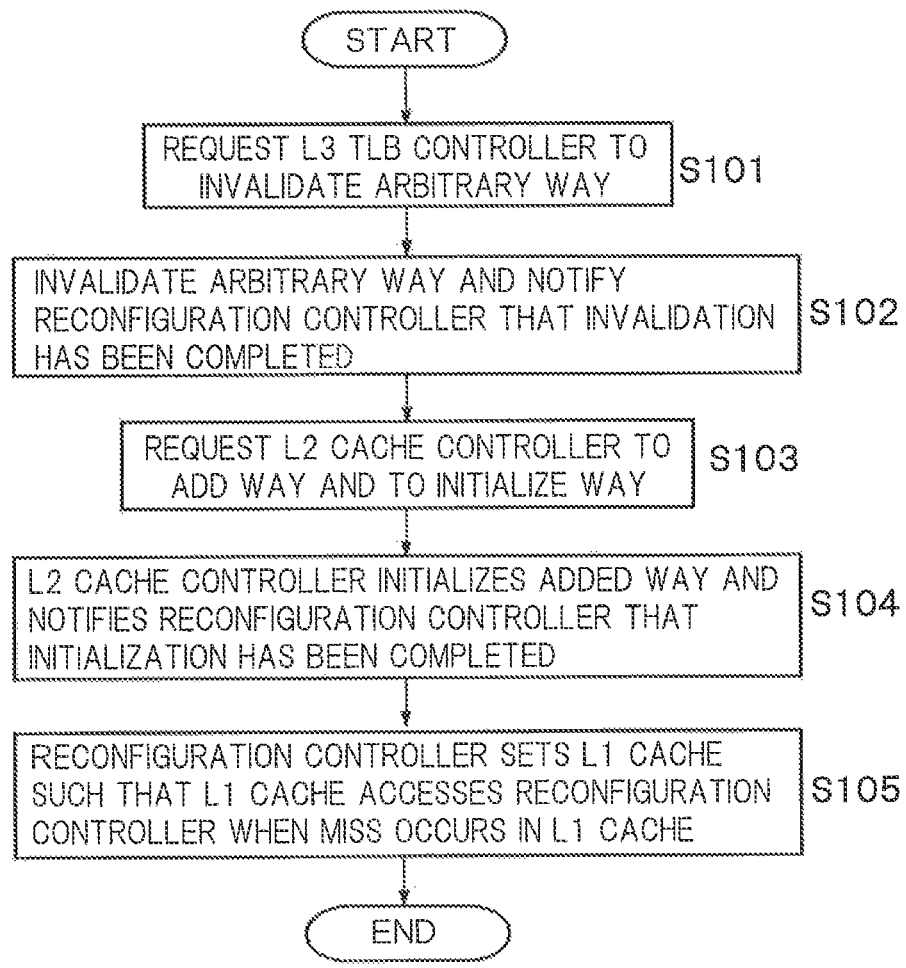
FIG. 23 is a flowchart illustrating a process which changes a portion of the reconfigurable memory from the TLB mode to the cache mode.

FIG. 23 is a flowchart illustrating an example of a process which changes the way in the TLB mode in the reconfigurable memory array 26 to the cache mode. First, the reconfiguration controller 21 requests the L3 TLB controller 28 to invalidate an arbitrary way (step S101). Then, the L3 TLB controller 28 invalidates the corresponding way and notifies the reconfiguration controller 21 that invalidation has been completed (step S102).

The reconfiguration controller 21 requests the L2 cache controller 27 to add a way and to initialize the way (step S103). Then, the L2 cache controller 27 initializes the added way and notifies the reconfiguration controller 21 that initialization has been completed (step S104). The reconfiguration controller 21 sets the L1 cache 8 such that the L1 cache 8 is accessed by the reconfiguration controller 21 when a cache miss occurs in the L1 cache 8 (step S105).

Figure 24:
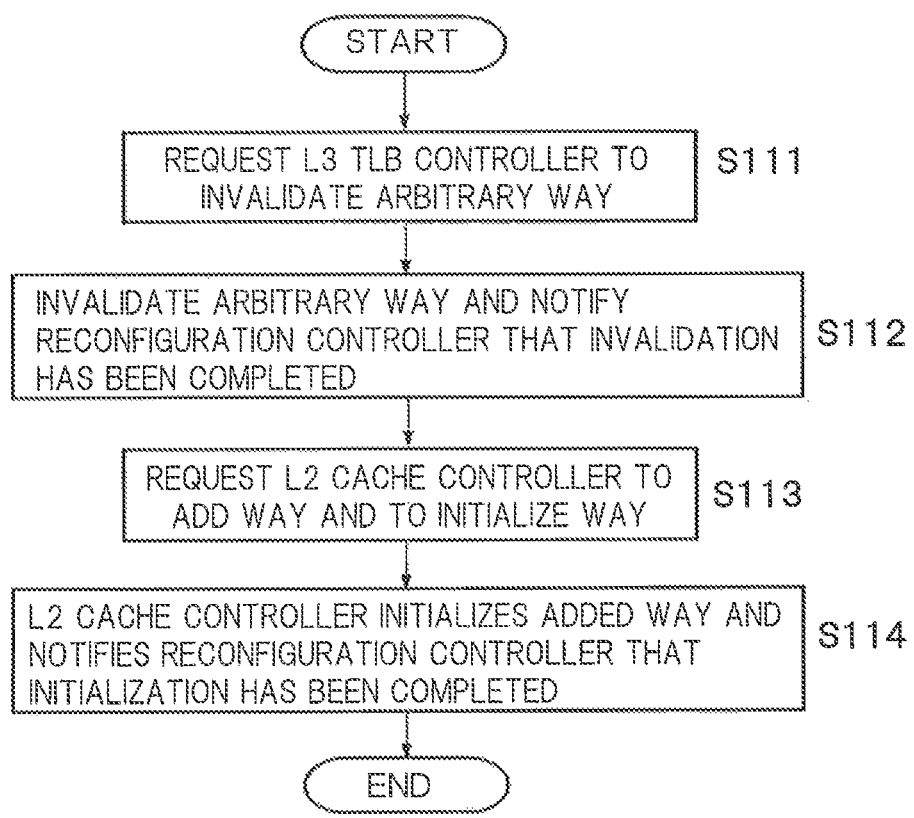
FIG. 24 is a flowchart illustrating a process which changes another portion of the reconfigurable memory from the TLB mode to the cache mode.

According to the process illustrated in FIG. 23, after an arbitrary way of the reconfigurable memory array 26 is changed from the TLB mode to the cache mode, another way can be changed to the cache mode. This process is performed as illustrated in, for example, the flowchart of FIG. 24.

Figure 22:
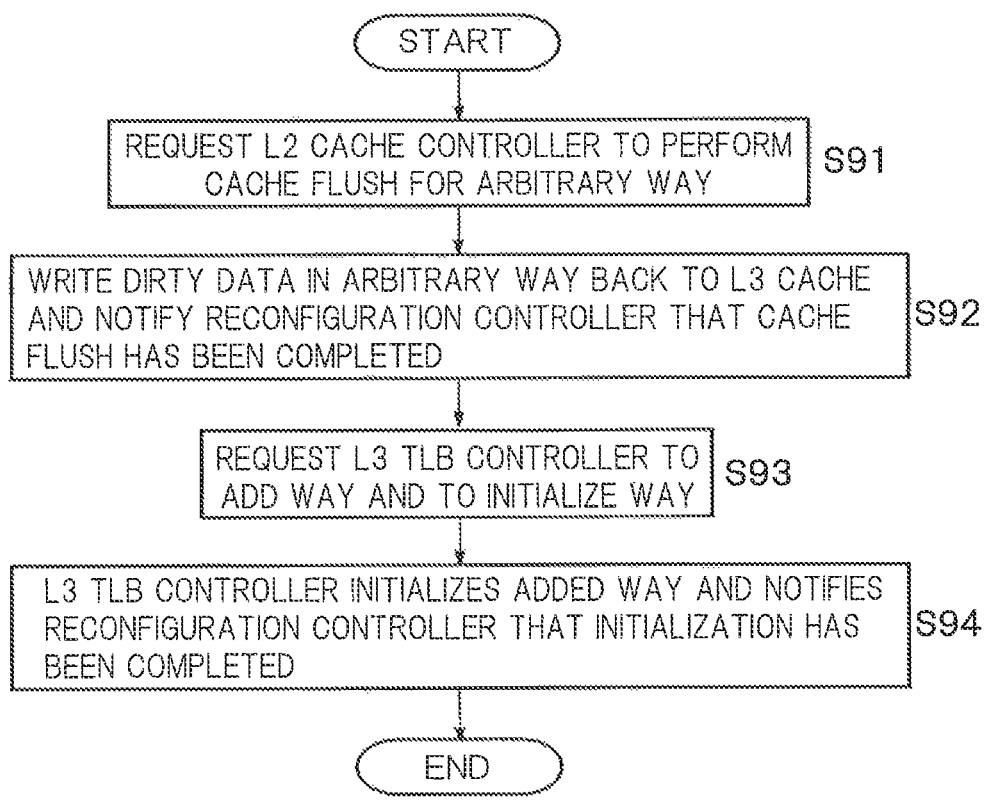
FIG. 22 is a flowchart illustrating a process which changes another portion of the reconfigurable memory from the cache mode to the TLB mode.

The reconfiguration controller 21 requests the L3 TLB controller 28 to invalidate an arbitrary way (step S111). The L3 TLB controller 28 invalidates the corresponding way and notifies the reconfiguration controller 21 that invalidation has been completed (step S112). Then, the same process as that in steps S103 and S104 illustrated in FIG. 22 is performed (steps S113 and S114).

Figure 25:
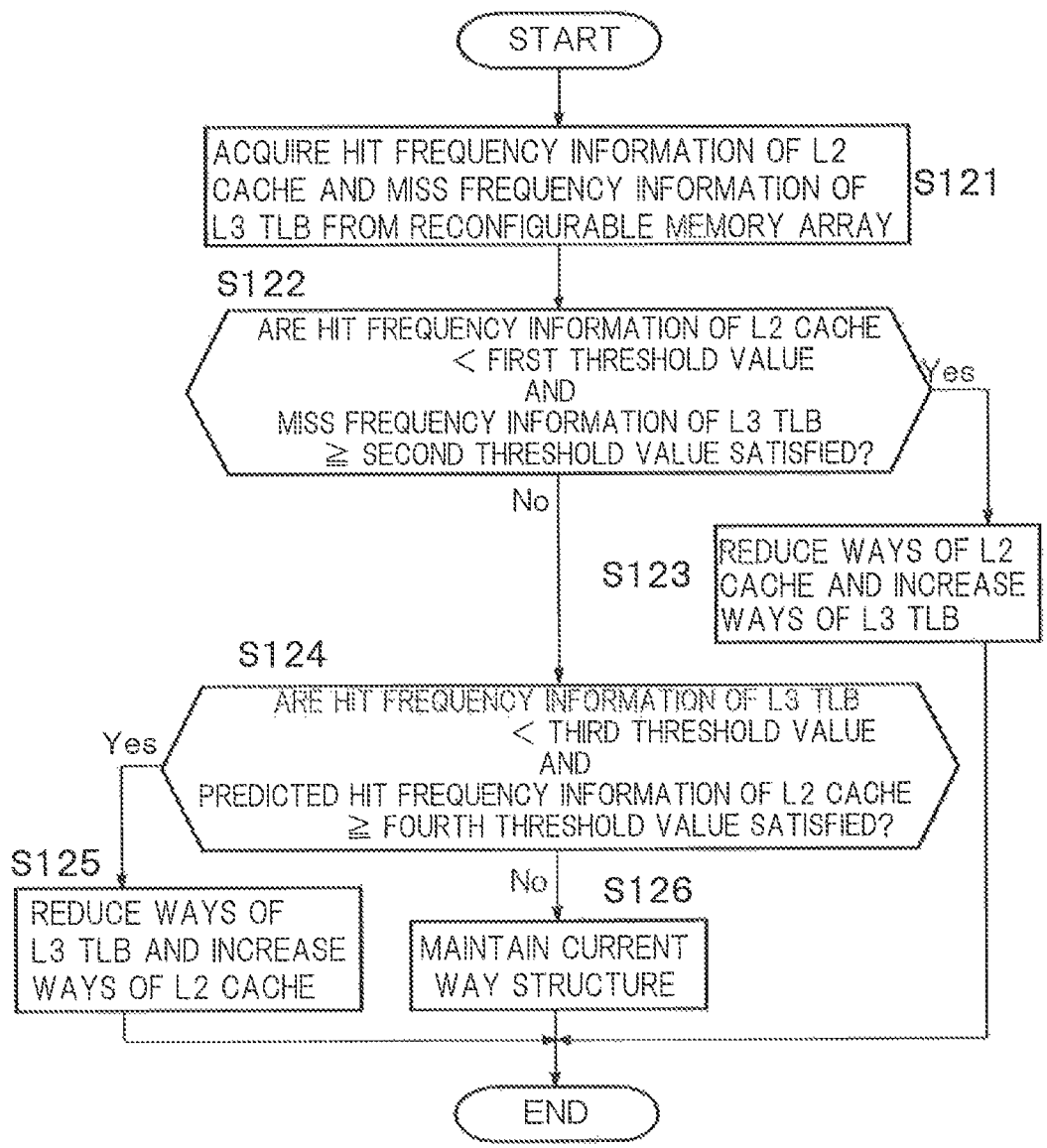
FIG. 25 is a flowchart illustrating a process of a reconfiguration controller 21 according to the third embodiment.

FIG. 25 is a flowchart illustrating a process of the reconfiguration controller 21 according to the third embodiment. This flowchart illustrates an example in which the reconfigurable memory array 26 has a full associative structure or a set associative structure including a plurality of ways.

First, the reconfiguration controller 21 acquires the cache hit frequency information of the L2 cache 9 and the miss frequency information of the L3 TLB 20 from the reconfigurable memory 22 (step S121).

Then, the reconfiguration controller 21 determines whether the cache hit frequency information of the L2 cache 9 is less than a first threshold value and the miss frequency information of the L3 TLB 20 is equal to or greater than a second threshold value (step S122).

When the determination result in step S122 is "Yes", the reconfiguration controller 21 reduces the number of ways in the L2 cache 9 and increases the number of ways in the L3 TLB 20 (step S123). Here, for example, the reconfiguration controller 21 reduces the region of the L2 cache 9 and increases the region of the L3 TLB 20 in units of one way or a plurality of ways.

When the determination result in step S122 is "No", the reconfiguration controller 21 determines whether the hit frequency information of the L3 TLB 20 is less than a third threshold value and the predicted hit frequency information of the L2 cache 9 is equal to or greater than a fourth threshold value (step S124).

When the determination result in step S124 is "Yes", the reconfiguration controller 21 reduces the number of ways in the L3 TLB 20 and increases the number of ways in the L2 cache 9 (step S125). When the determination result in step S124 is "No", the reconfigurable memory array 26 maintains the current way structure and ends the process illustrated in FIG. 25.

In the third embodiment, the hierarchy of the cache memory and the hierarchy of the TLB allocated to the reconfigurable memory 22 are arbitrary and are not limited to the L2 cache 9 and the L3 TLB 20.

When the reconfigurable memory array 26 is not divided into a plurality of ways, for example, whether each memory block with a predetermined memory size is used as the L2 cache 9 or the L3 TLB 20 may be set.

As such, in the third embodiment, the reconfigurable memory array 26 can include both the cache memory region and the TLB region. Therefore, it is possible to increase or decrease the ratio of the cache memory and the TLB in the reconfigurable memory array 26, according to cache access information or TLB miss access information, and thus to reduce a cache miss or a TLB miss.

Fourth Embodiment

Figure 26:
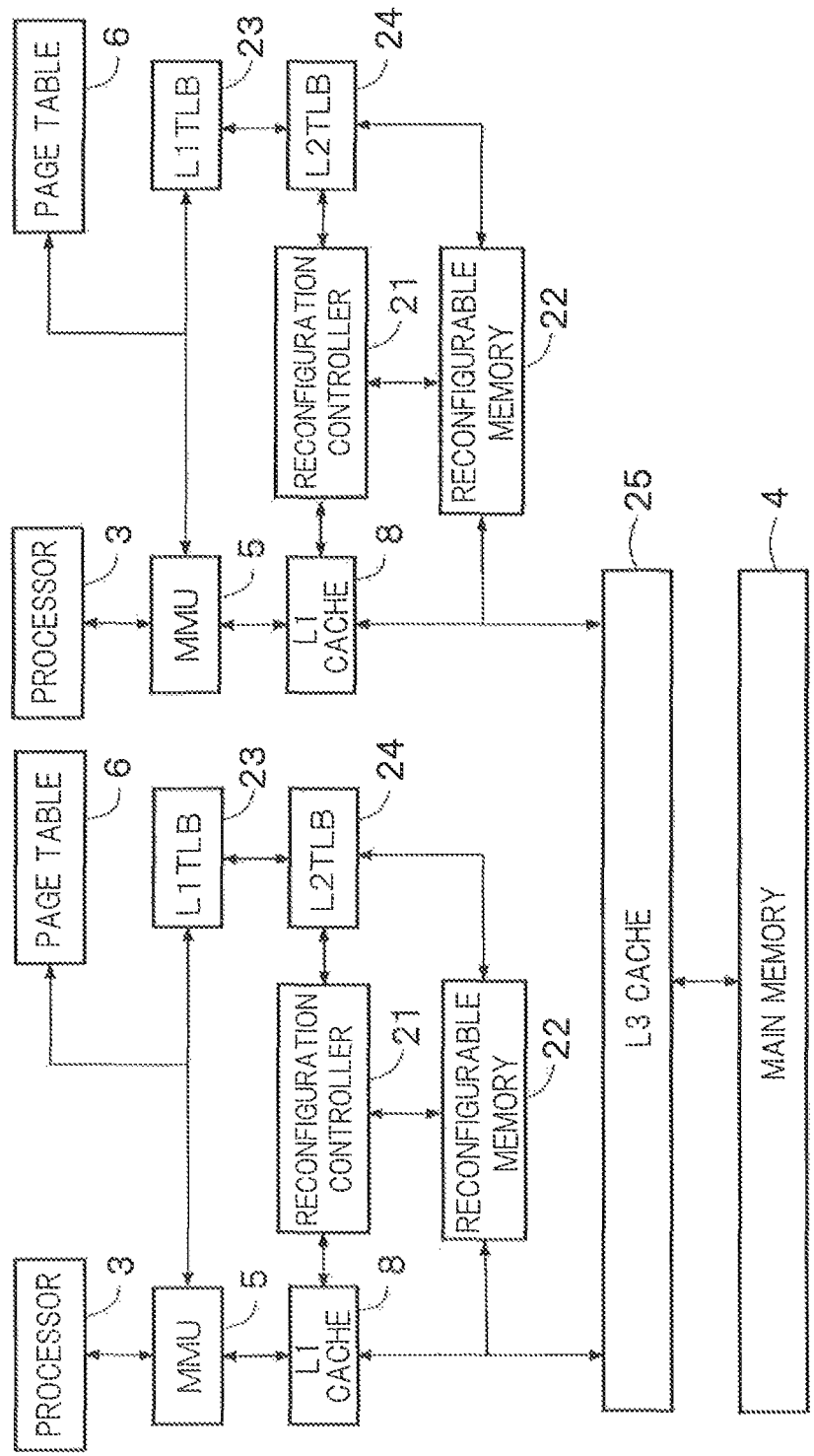
FIG. 26 is a block diagram illustrating a first example in which the second or third embodiment is applied to multiple cores.

In FIGS. 1 to 25, the processor 3 has a single core. However, the first, second, and third embodiments can be applied to the processor 3 with various structures. For example, FIG. 26 is a block diagram illustrating a first example in which the second or third embodiment is applied to multiple cores. FIG. 26 illustrates an example in which two processors 3 are provided. An MMU 5, a page table 6, an L1 cache 8, a reconfiguration controller 21, a reconfigurable memory 22, an L1 TLB 23, and an L2 TLB 24 are provided for each processor 3. An L3 cache 25 and a main memory 4 are shared by two processors 3. When three or more processors 3 are provided in the structure illustrated in FIG. 26, the L3 cache 25 and the main memory 4 are shared by all of the processors 3.

Figure 27:
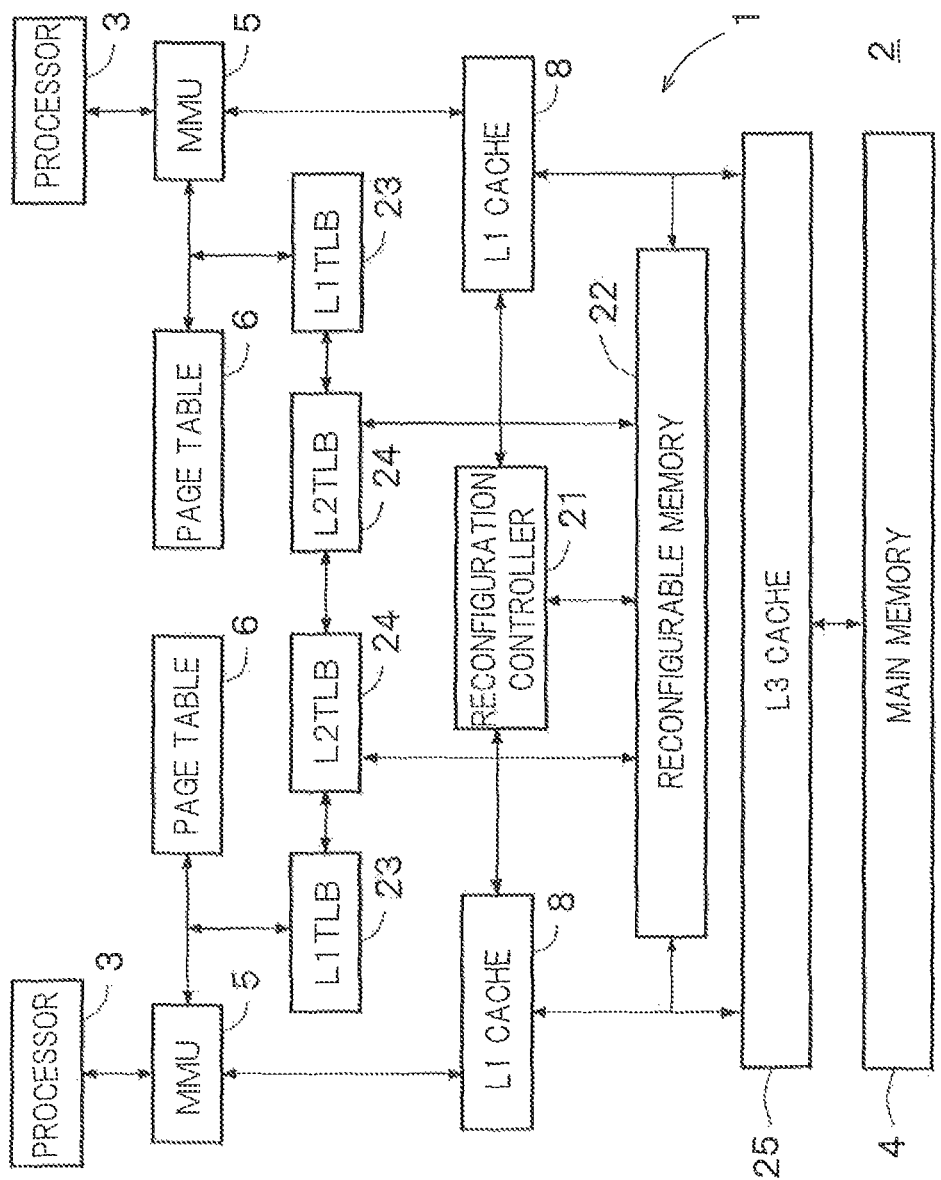
FIG. 27 is a block diagram illustrating a second example in which the second or third embodiment is applied to multiple cores.

FIG. 27 is a block diagram illustrating a second example in which the second or third embodiment is applied to multiple cores. In FIG. 27, unlike FIG. 26, the L3 cache 25, the main memory 4, the reconfiguration controller 21, and the reconfigurable memory 22 are shared by all of the processors 3. According to the structure illustrated in FIG. 27, for example, the load of the reconfigurable memory 22 is divided by each processor 3 according to the processing load of each processor 3. Therefore, it is possible to effectively use the reconfigurable memory 22. In addition, according to the structure illustrated in FIG. 27, it is possible to reduce the number of reconfiguration controllers 21 and the number of reconfigurable memories 22. Therefore, it is possible to simplify the hardware structure of the memory system 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory system comprising:
a non-volatile memory;
a first translation lookaside buffer that stores address conversion information indicating the conversion of a virtual address issued by a processor into a physical address; and
a first control circuitry that determines whether to use the non-volatile memory as a first cache memory which can be accessed at a higher speed than a main memory or as a second translation lookaside buffer which has a lower access priority than the first translation lookaside buffer, based on whether the first translation lookaside buffer has an effect on a processing performance of the processor.

2. The memory system according to claim 1,
wherein the non-volatile memory has a set associative structure comprising a plurality of ways or a full associative structure comprising a plurality of ways and comprises a plurality of ways including memory regions with an equal size, and
the first control circuitry determines whether to use at least one of the plurality of ways as the second translation lookaside buffer.

3. The memory system according to claim 2,
wherein the non-volatile memory has a set associative structure comprising the plurality of ways and a plurality of sets, and
when the first control circuitry determines that the non-volatile memory is used as the second translation lookaside buffer, the first control circuitry uses all of the sets in one or more ways among the plurality of ways to store the address conversion information in the second translation lookaside buffer during power-off.

4. The memory system according to claim 2, further comprising:
a second control circuitry that controls the first cache memory,
wherein the second control circuitry controls whether to use each way as the first cache memory and manages a way which is used as the first cache memory and a way which stores the address conversion information stored in the first translation lookaside buffer during power-off.

5. The memory system according to claim 4,
wherein the second control circuitry comprises a register that is incremented according to the number of ways used as the first cache memory and is decremented according to the number of ways storing the address conversion information, or a register that is decremented according to the number of ways used as the first cache memory and is incremented according to the number of ways storing the address conversion information.

6. The memory system according to claim 2, further comprising:
a second control circuitry that controls the first cache memory; and
a third control circuitry that controls the second translation lookaside buffer,
wherein the first control circuitry requests the second control circuitry to write data, which is not written to a lower-level memory among data stored in at least one of cache regions of the first cache memory, to the lower-level memory,
the second control circuitry writes the data in the cache region to the lower-level memory in response to the request and notifies the first control circuitry that the writing is completed,
the first control circuitry requests the third control circuitry to initialize the cache region,
the third control circuitry initializes the cache region, notifies the first control circuitry that initialization is completed, and controls the cache region as the second translation lookaside buffer, and
the first control circuitry uses the cache region as the second translation lookaside buffer.

7. The memory system according to claim 2, further comprising:
a second control circuitry that controls the first cache memory,
wherein the first control circuitry requests the second control circuitry to initialize a region used as the second translation lookaside buffer,
the second control circuitry initializes the region used as the second translation lookaside buffer and notifies the first control circuitry that the initialization is completed, and
the first control circuitry uses the initialized region as the first cache memory.

8. The memory system according to claim 2, further comprising:
a second control circuitry that controls the first cache memory; and
a third control circuitry that controls the second translation lookaside buffer,
wherein, when one or more ways which are used as the first cache memory are used as the second translation lookaside buffer, the first control circuitry requests the second control circuitry to write data, which needs to be written to a lower-level memory that is at a lower level than the first cache memory among data items in the one or more ways, to the lower-level memory,
the second control circuitry writes the data to the lower-level memory in response to the request and notifies the first control circuitry that the data is written to the lower-level memory,
the first control circuitry requests the third control circuitry to initialize the one or more ways,
the third control circuitry initializes the one or more ways, notifies the first control circuitry that the initialization is completed, and controls the one or more ways as the second translation lookaside buffer, and
the first control circuitry uses the one or more ways as the second translation lookaside buffer.

9. The memory system according to claim 8,
wherein the first control circuitry controls whether to use one or more ways as the first cache memory or the second translation lookaside buffer, on the basis of at least miss information of the first translation lookaside buffer.

10. The memory system according to claim 2, further comprising:
a second control circuitry that controls the first cache memory; and
a third control circuitry that controls the second translation lookaside buffer, wherein, when one or more ways which are used as the second translation lookaside buffer are used as the first cache memory, the first control circuitry requests the third control circuitry to invalidate the one or more ways, the third control circuitry notifies the first control circuitry that the one or more ways are invalidated and suspends operation of controlling the invalidated way as the second translation lookaside buffer, the first control circuitry requests the second control circuitry to initialize the one or more ways, the second control circuitry initializes the one or more ways and notifies the first control circuitry that the initialization is completed, and the first control circuitry uses the one or more ways as the first cache memory.

11. The memory system according to claim 1, wherein the non-volatile memory is a magnetoresistive random access memory (MRAM).

12. A memory system comprising:
a non-volatile memory;
a first translation lookaside buffer that stores address conversion information indicating the conversion of a virtual address issued by a processor into a physical address;
a first control circuitry that determines whether to use the non-volatile memory as a cache memory or as a second translation lookaside buffer which has a lower access priority than the first translation lookaside buffer; and
a second control circuitry that controls the cache memory or the second translation lookaside buffer,
wherein when the non-volatile memory is switched from the cache memory to the second translation lookaside buffer, the first control circuitry requests the second control circuitry to invalidate the cache memory,
when there is data that is not written to a lower-level memory, the second control circuitry writes the data in the cache region to the lower-level memory in response to the request and then invalidates the cache memory, and
after the cache memory has been invalidated, the first control circuitry switches the non-volatile memory from the cache memory to the second translation lookaside buffer.

13. The memory system according to claim 12,
wherein the second control circuitry comprises:
a third control circuitry that controls the cache memory; and
a fourth control circuitry that controls the second translation lookaside buffer,
wherein when the non-volatile memory is switched from the cache memory to the second translation buffer, the first control circuitry requests the third control circuitry to invalidate the cache memory,
when there is data that is not written to the lower-level memory, the third controller writes data in the cache memory to the lower-level memory in response to the request the request, after data in the cache memory has been written to the lower-level memory, the first control circuitry requests the fourth control circuitry to initialize the non-volatile memory, the fourth control circuitry initializes the non-volatile memory in response to the request of initialization of the non-volatile memory and then notifies the first control circuitry that initialization of the non-volatile memory has been completed, and the first controller switches the non-volatile memory from the cache memory to the second translation buffer after the initialization of the non-volatile memory has been completed.

14. The memory system according to claim 12,
wherein the non-volatile memory is a magnetoresistive random access memory (MRAM).

15. A memory system comprising:
a non-volatile memory;
a first translation lookaside buffer that stores address conversion information indicating the conversion of a virtual address issued by a processor into a physical address;
a first control circuitry that determines whether to use the non-volatile memory as a first cache memory which can be accessed at a higher speed than a main memory or as a second translation lookaside buffer which has a lower access priority than the first translation lookaside buffer; and
a second control circuitry that controls the first cache memory,
wherein the non-volatile memory has a set associative structure comprising a plurality of ways or a full associative structure comprising a plurality of ways and comprises a plurality of ways including memory regions with an equal size,
the first control circuitry determines whether to use at least one of the plurality of ways as the second translation lookaside buffer, and
the second control circuitry controls whether to use each way as the first cache memory and manages a way which is used as the first cache memory and a way which stores the address conversion information stored in the first translation lookaside buffer during power-off.

16. The memory system according to claim 15,
wherein the second control circuitry comprises a register that is incremented according to the number of ways used as the first cache memory and is decremented according to the number of ways storing the address conversion information, or a register that is decremented according to the number of ways used as the first cache memory and is incremented according to the number of ways storing the address conversion information.

17. The memory system according to claim 15,
wherein the non-volatile memory is a magnetoresistive random access memory (MRAM).

* * * * *